(12) United States Patent
Camp

(10) Patent No.: US 12,497,126 B2
(45) Date of Patent: Dec. 16, 2025

(54) BICYCLE SUSPENSION COMPONENTS

(71) Applicant: SRAM, LLC, Chicago, IL (US)

(72) Inventor: David Camp, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 559 days.

(21) Appl. No.: 17/947,315

(22) Filed: Sep. 19, 2022

(65) Prior Publication Data

US 2024/0092451 A1 Mar. 21, 2024

(51) Int. Cl.
  *B62K 25/28* (2006.01)
  *F16F 9/06* (2006.01)

(52) U.S. Cl.
  CPC ............ *B62K 25/286* (2013.01); *F16F 9/065* (2013.01); *F16F 9/067* (2013.01)

(58) Field of Classification Search
  CPC ...... B62K 25/286; B62K 25/08; B62K 25/04; B62K 2201/08; F16F 9/065; F16F 9/067
  USPC ........................................................ 280/284
  See application file for complete search history.

(56) References Cited

U.S. PATENT DOCUMENTS

| | | | |
|---|---|---|---|
| 6,296,092 B1* | 10/2001 | Marking | F16F 9/0209 188/315 |
| 2019/0072148 A1* | 3/2019 | Sakai | F16F 9/19 |
| 2021/0214041 A1* | 7/2021 | Sullivan | B62K 25/08 |

FOREIGN PATENT DOCUMENTS

| | | |
|---|---|---|
| CN | 101554909 | 10/2009 |
| EP | 1754909 B1 | 10/2011 |
| TW | M404816 U | 6/2011 |
| WO | 99/27273 | 6/1999 |
| WO | 2008086605 A1 | 7/2008 |

* cited by examiner

*Primary Examiner* — Marc Q Jimenez

(57) ABSTRACT

Bicycle suspension components are described herein. An example damper for a bicycle suspension component includes a damper body defining a chamber and a damper member disposed in the chamber. The damper member includes a piston having a first compression port and a bypass compression port. The damper member includes a first valve to control fluid flow through the first compression port and a second valve to control fluid flow through the bypass compression port. During a first portion of travel of the damper member during a compression stroke, the second valve is to open to enable fluid flow through the bypass compression port from a first chamber to a second chamber, and during a second portion of travel of the damper member during the compression stroke, the first valve is to open to enable fluid flow through the first compression port from the first chamber to the second chamber.

18 Claims, 15 Drawing Sheets

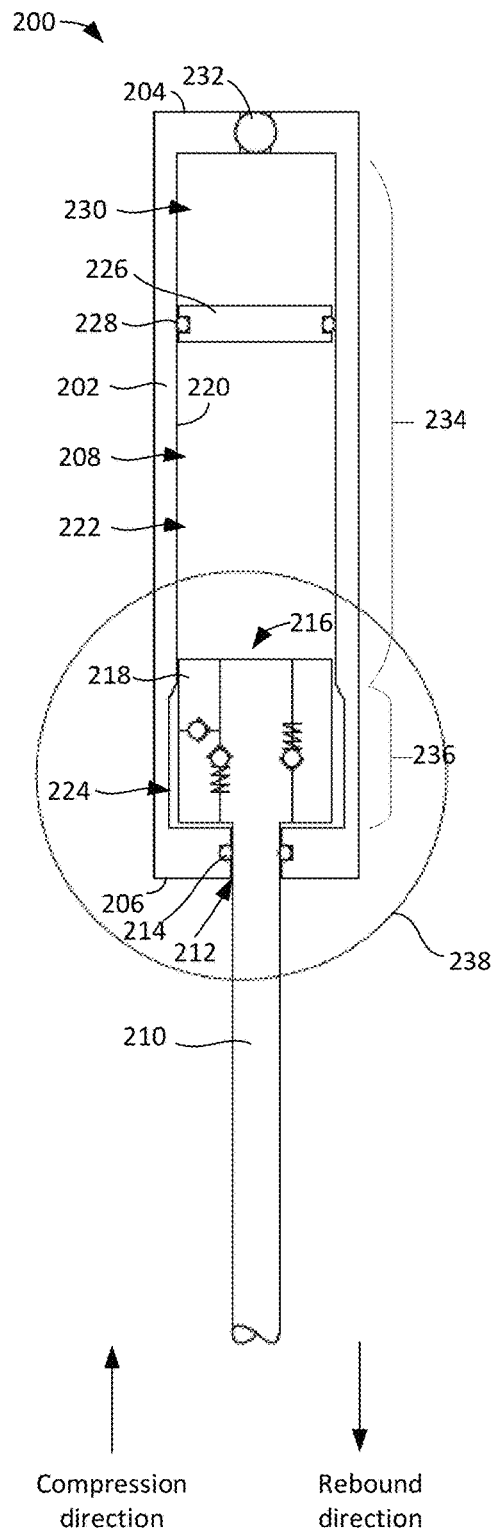
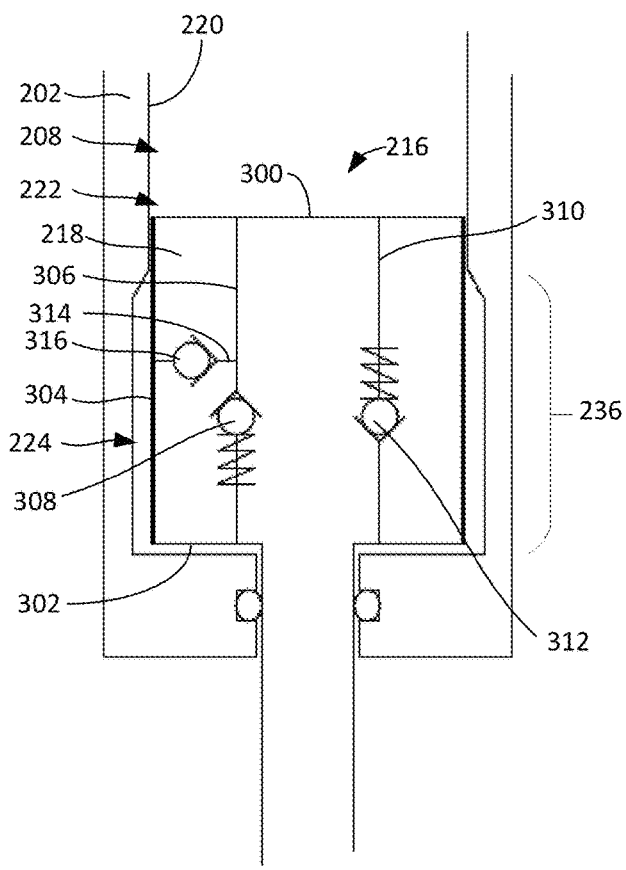
FIG. 2
FIG. 3

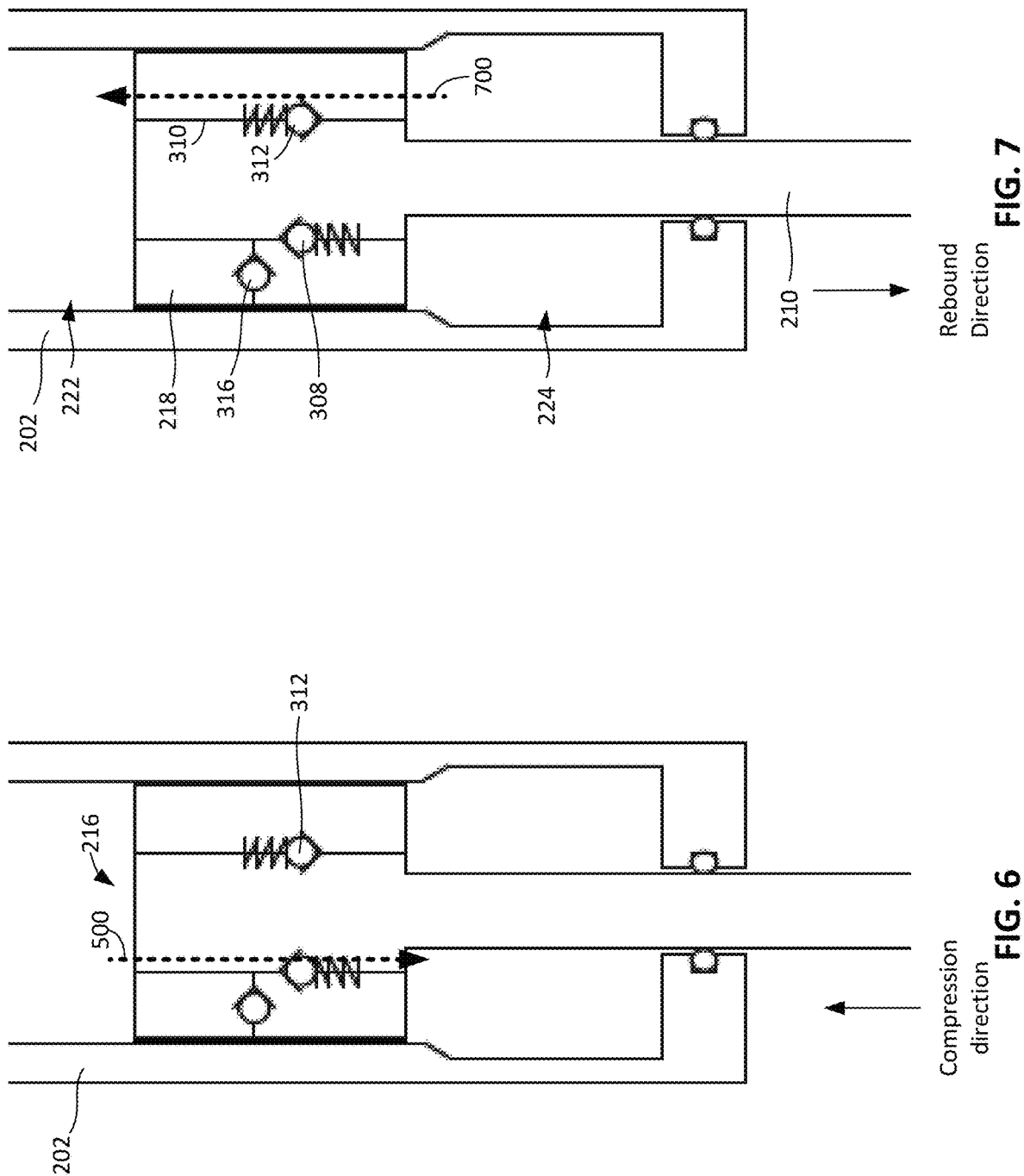

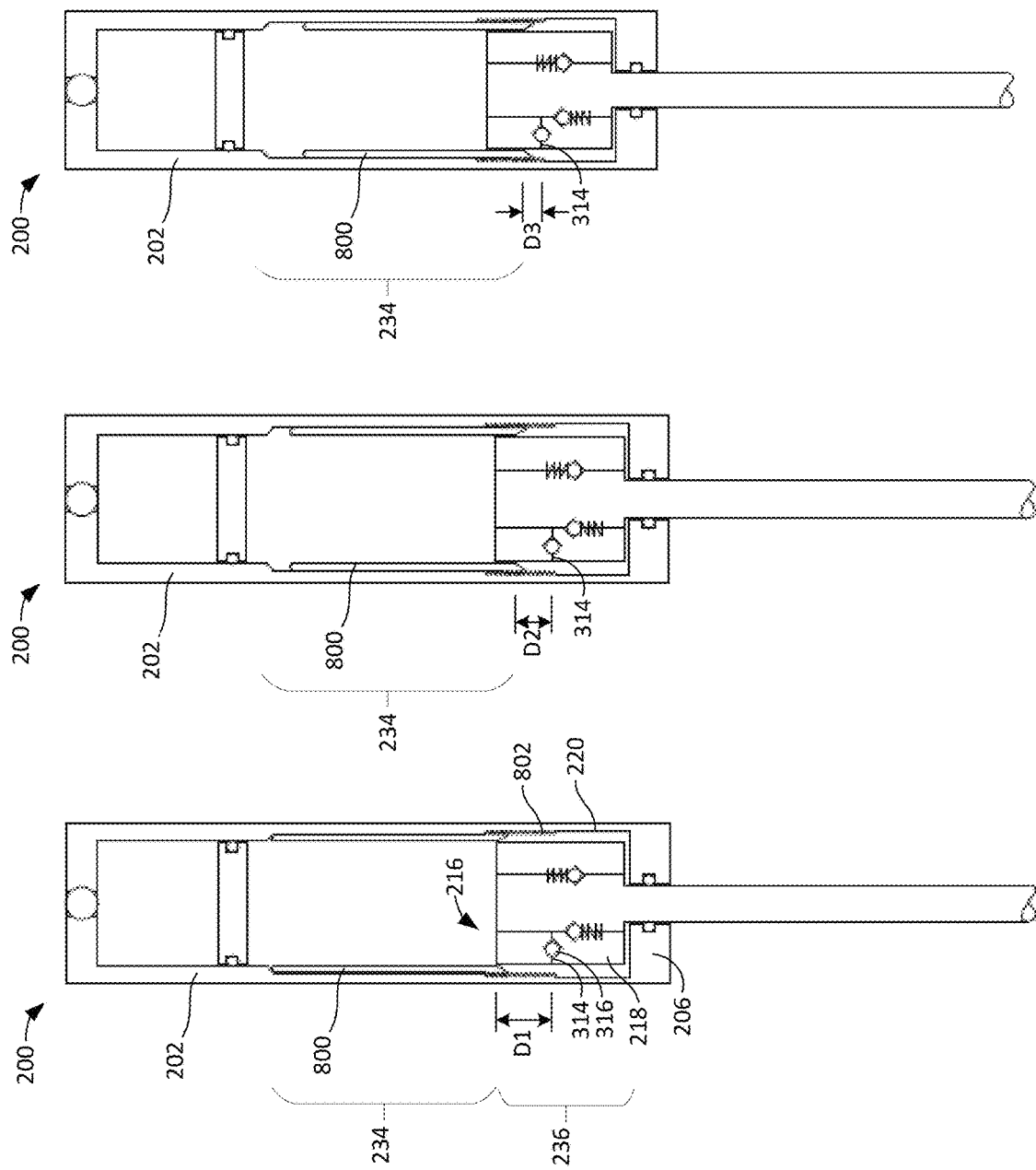

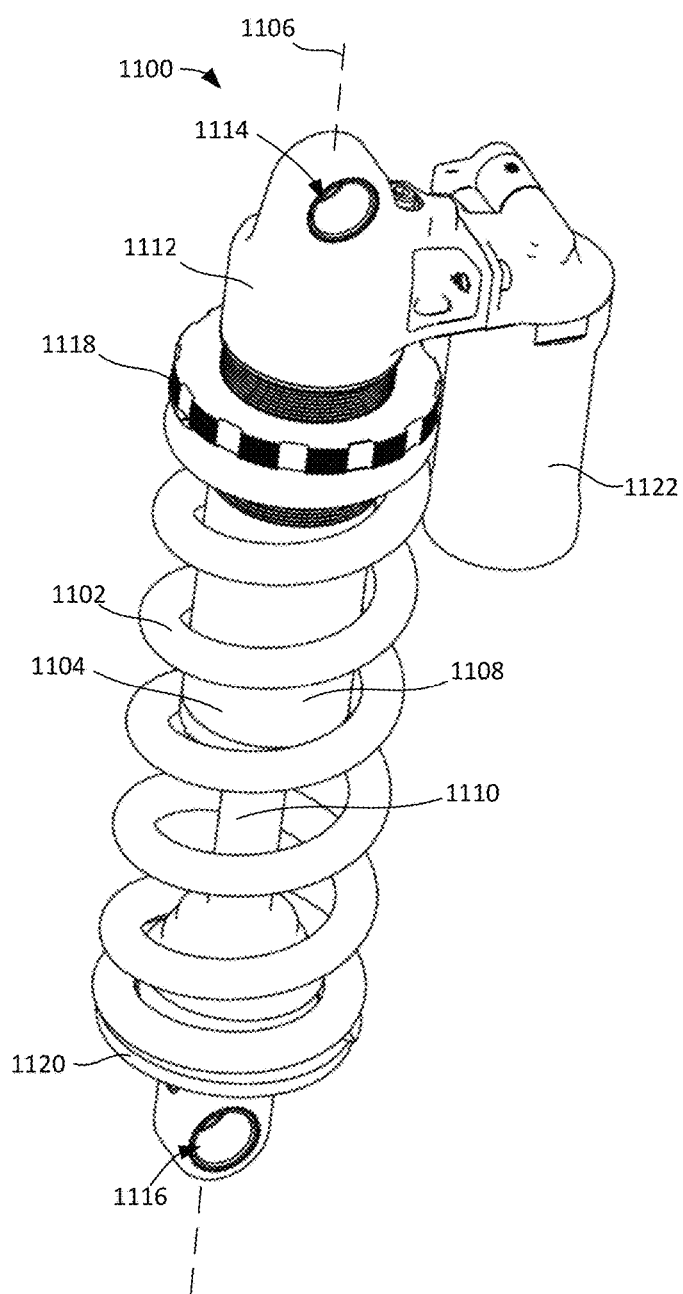
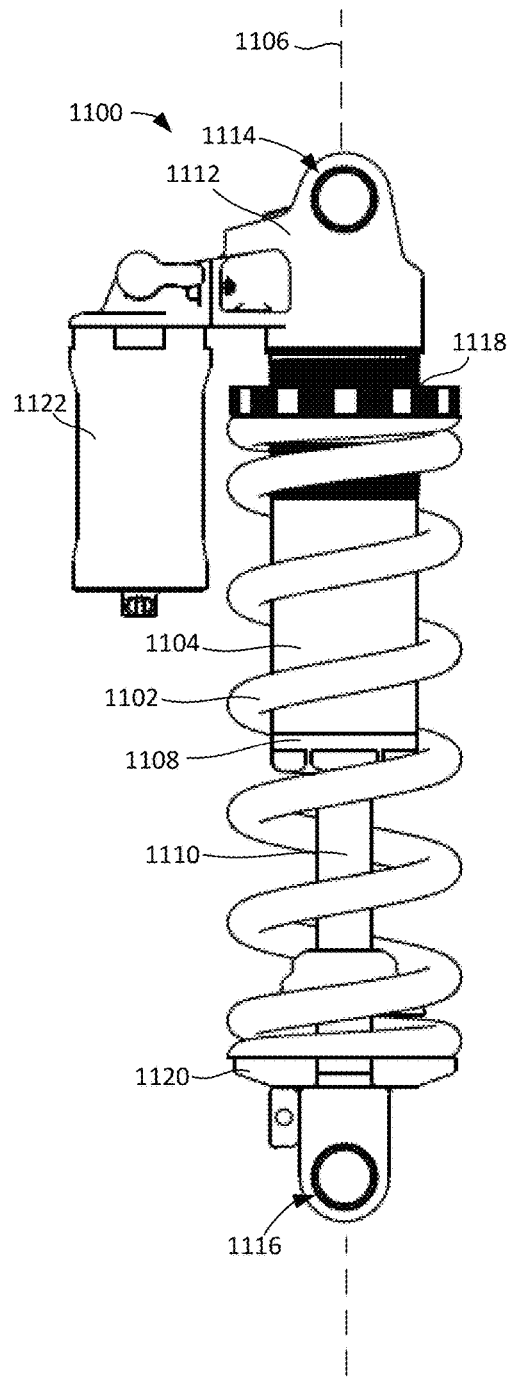
FIG. 11
FIG. 12

BICYCLE SUSPENSION COMPONENTS

FIELD OF THE DISCLOSURE

This disclosure relates generally to bicycle components and, more specifically, to bicycle suspension components.

BACKGROUND

Bicycles are known to have suspension components. Suspension components are used for various applications, such as cushioning impacts, vibrations, or other disturbances experienced by the bicycle during use as well as maintaining ground contact for traction. A common application for suspension components on bicycles is cushioning impacts or vibrations experienced by the rider when the bicycle is ridden over bumps, ruts, rocks, potholes, and/or other obstacles. These suspension components include rear and/or front wheel suspension components. Suspension components may also be used in other locations, such as a seat post or handlebar, to insulate the rider from impacts.

SUMMARY

Disclosed herein is an example damper for a suspension component of a bicycle. The damper includes a damper body defining a chamber, a shaft extending into the damper body, and a damper member disposed in the chamber and coupled to the shaft. The damper member divides the chamber into a first chamber and a second chamber. The damper member includes a piston having a primary compression port and a bypass compression port. The damper member includes a first valve to control fluid flow through the primary compression port and a second valve to control fluid flow through the bypass compression port. During a first portion of travel of the damper member during a compression stroke, the second valve is to open to enable fluid flow through the bypass compression port from the first chamber to the second chamber, and during a second portion of travel of the damper member during the compression stroke, the first valve is to open to enable fluid flow through the primary compression port from the first chamber to the second chamber.

Disclosed herein is an example damper for a suspension component of a bicycle. The damper includes a damper body defining a chamber. The chamber has a first section with a first cross-sectional area and a second section with a second cross-sectional area greater than the first cross-sectional area. The damper also includes a shaft extending into the damper body and a damper member disposed in the chamber and coupled to the shaft. The damper member divides the chamber into a first chamber and a second chamber. The damper member includes a piston having a plurality of radial openings, a first seal around the piston, and a second seal around the piston. The radial openings are axially spaced between the first and second seals. During a first portion of travel of the damper member during a compression stroke, the first seal is engaged with an inner surface of the damper body along the first section of the chamber and the second seal is spaced from the inner surface of the damper body along the second section of the chamber to enable fluid flow through the radial openings from the first chamber to the second chamber. During a second portion of travel of the damper member during the compression stroke, the first and second seals are engaged with the inner surface along the first section of the chamber to prevent fluid flow through the radial openings from the first chamber to the second chamber.

Disclosed herein is an example damper for a suspension component of a bicycle. The damper includes a damper body, a shaft extending into the damper body, a damper member disposed in the damper body and coupled to the shaft, the damper member including a piston sealingly engaged with an inner surface of the damper body to divide the damper body into a first chamber and a second chamber, first means for allowing fluid flow across the piston from the first chamber to the second chamber during a first portion of travel of the damper member during a compression stroke, and second means for allowing fluid flow across the piston from the first chamber to the second chamber during a second portion of travel of the damper member during the compression stroke.

BRIEF DESCRIPTION OF THE DRAWINGS

FIG. 2 is a schematic diagram of an example damper that may be implemented on the example bicycle of FIG. 1.

FIG. 3 is an enlarged view of the callout in FIG. 2 showing an example damper member of the example damper.

FIG. 6 illustrates the example damper of FIG. 3 in another position during the second portion of travel of the example damper member.

FIG. 7 illustrates the example damper member of FIG. 3 showing a rebound flow path during a rebound stroke.

FIGS. 8-10 illustrate the example damper of FIG. 2 having an example adjustable sleeve.

FIG. 11 is a perspective view of an example shock absorber that can be implemented on the example bicycle of FIG. 1. The example shock absorber includes an example spring and an example damper.

FIG. 12 is a side view of the example shock absorber of FIG. 11.

The figures are not to scale. Instead, the thickness of the layers or regions may be enlarged in the drawings. In general, the same reference numbers will be used throughout the drawing(s) and accompanying written description to refer to the same or like parts.

Figure 1:
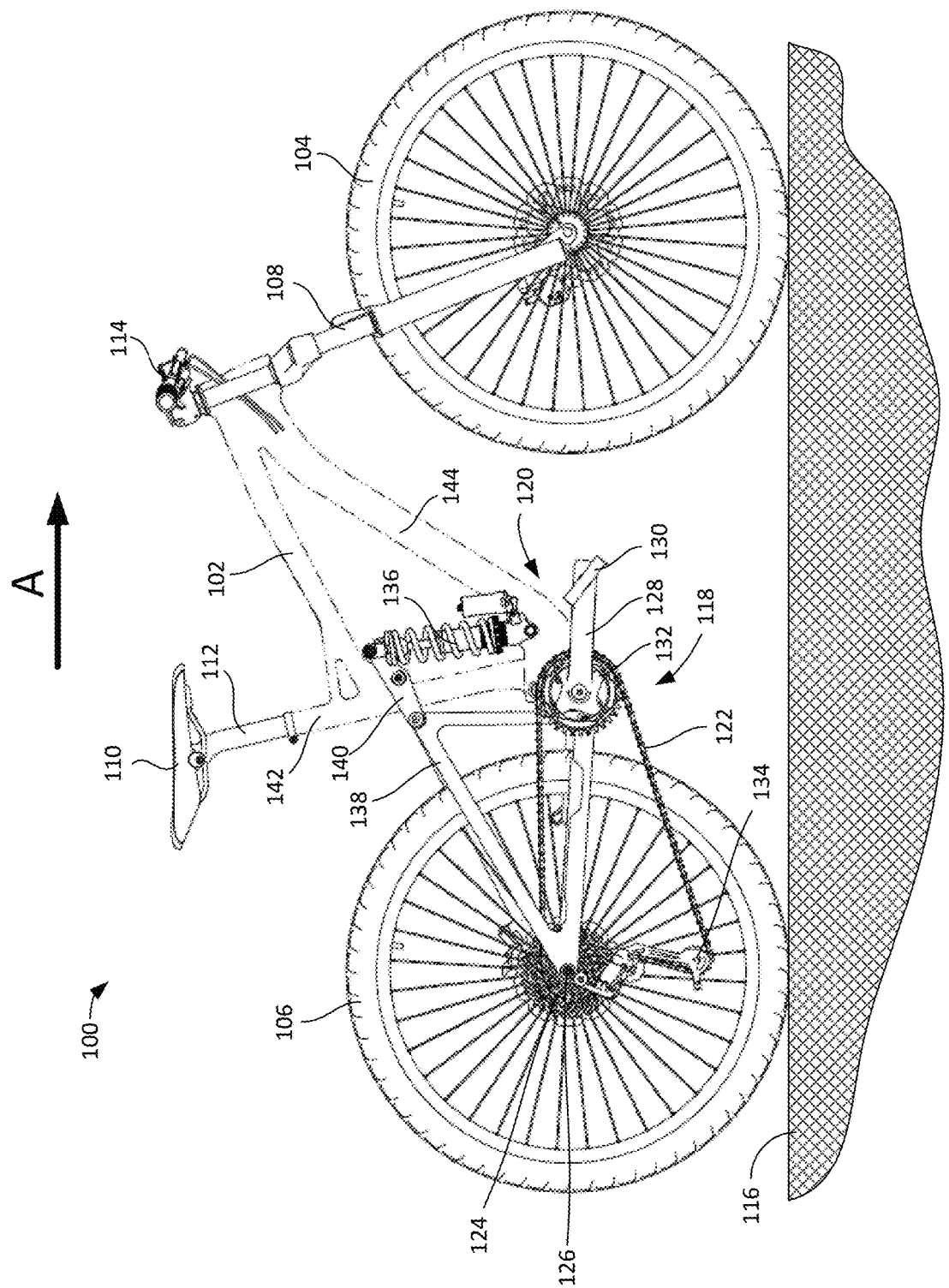
FIG. 1 is a side view of an example bicycle that may employ example suspension components disclosed herein.

Descriptors "first," "second," "third," etc. are used herein when identifying multiple elements or components that may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Disclosed herein are example dampers that may be implemented in a suspension component of a vehicle, such as a bicycle. The example dampers may be utilized as part of a shock absorber, which incorporates a damper and a spring that act in conjunction to absorb shock impulses. The example dampers disclosed herein are position sensitive and can achieve varying levels of damping during compression based on the damper position. For example, the damper may provide a first level of damping during a first portion of the compression stroke and a second level of damping during a second portion of the compression stroke. Therefore, the damper provides two stages of compression damping. The first level of damping may be less than the second level of damping, such that there is less resistance during the initial movement to allow the shock absorber to begin to compress. This produces better tire traction when the tire makes initial contact with the ground and improves overall suspension performance.

It is generally known that a damper requires a certain breakaway force before the ends of the damper move toward or away from each other. This is because a damper typically includes a piston with one or more seals or valves, and a certain amount of pressure differential is required to open the seals or valves to enable the damper member to move. This is sometimes often referred to as a cracking pressure. As such, when experiencing a compressive force, there is a slight delay while the pressure builds up before the ends of the shock absorber compress. This results in a stick slip feel that can be felt by the rider at the handlebars. Further, high frequency (e.g., frequencies above 5 hertz (Hz)), lower amplitude vibrations, such as those caused by a washboard terrain, are typically not absorbed by the damper and spring. Instead, these high frequency vibrations are transmitted through the frame and, thus, can be felt by the rider.

An example damper disclosed herein includes a damper body defining a chamber, a shaft extending into the damper body, and a damper member disposed in the chamber of the damper body and coupled to the shaft. The damper member includes a piston that is moveable (e.g., slidable) along an inner surface of the damper body. The damper member divides the chamber into a first chamber and a second camber. The damper member includes flow paths across the piston that enable fluid to flow between the first chamber and the second chamber during compression and rebound. In particular, in some examples disclosed herein, the damper member includes a primary compression flow path with a first check valve and a bypass compression flow path with a second check valve. The second check valve has a lower cracking pressure than the first check valve. Therefore, during the initial buildup of pressure during a compression stroke, the second check valve opens to allow fluid flow from the first chamber to the second chamber through the bypass compression flow path. While the bypass compression flow path provides lower compression damping, this enables the damper to compress more quickly without such a delay as seen in known dampers. This helps to absorb shocks and vibrations more quickly, and is also advantageous when the bicycle tire makes contact with the ground (e.g., when landing). During a first portion of travel of the damper member, fluid may flow through the bypass compression flow path and the second check valve. Then, during a second portion of travel of the damper member, the second check valve closes and the pressure buildup opens the first check valve, which allows fluid flow from the first chamber to the second chamber through the primary compression flow path. In some examples, the first portion of travel may account for 15% of the shock absorber stroke, while the second portion of the travel may account for the other 85% of the shock absorber stroke. However, in other examples, the percentages can be different.

Turning now to the figures, FIG. 1 illustrates one example of a human powered vehicle on which the example suspension components disclosed herein may be implemented. In this example, the vehicle is one possible type of bicycle 100, such as a mountain bicycle. In the illustrated example, the bicycle 100 includes a frame 102 and a front wheel 104 and a rear wheel 106 rotatably coupled to the frame 102. In the illustrated example, the front wheel 104 is coupled to the front end of the frame 102 via a front fork 108. A front and/or forward riding direction or orientation of the bicycle 100 is indicated by the direction of the arrow A in FIG. 1. As such, a forward direction of movement for the bicycle 100 is indicated by the direction of arrow A.

In the illustrated example of FIG. 1, the bicycle 100 includes a seat 110 coupled to the frame 102 (e.g., near the rear end of the frame 102 relative to the forward direction A) via a seat post 112. The bicycle 100 also includes handlebars 114 coupled to the frame 102 and the front fork 108 (e.g., near a forward end of the frame 102 relative to the forward direction A) for steering the bicycle 100. The bicycle 100 is shown on a riding surface 116. The riding surface 116 may be any riding surface such as the ground (e.g., a dirt path, a sidewalk, a street, etc.), a man-made structure above the ground (e.g., a wooden ramp), and/or any other surface.

In the illustrated example, the bicycle 100 has a drivetrain 118 that includes a crank assembly 120. The crank assembly 120 is operatively coupled via a chain 122 to a sprocket assembly 124 mounted to a hub 126 of the rear wheel 106. The crank assembly 120 includes at least one, and typically two, crank arms 128 and pedals 130, along with at least one front sprocket, or chainring 132. A rear gear change device 134, such as a derailleur, is disposed at the rear wheel 106 to move the chain 122 through different sprockets of the sprocket assembly 124. Additionally or alternatively, the bicycle 100 may include a front gear change device to move the chain 122 through gears on the chainring 132.

The example bicycle 100 includes a suspension system having one or more suspension components. In the illustrated example, the bicycle 100 includes a rear suspension component 136. In this example, the suspension component 136 is implemented as or includes a shock absorber, referred to herein as the shock absorber 136. The shock absorber 136 is coupled between two shock attachment portions (also referred to as mounting points) on the frame 102 of the bicycle 100. For instance, in this example, the frame 102 of the bicycle 100 includes a rear triangle 138 (which can actually be two triangles, one on each side of the rear wheel 106) and a rocker 140. A lower end of the rear triangle 138 is pivotally coupled by a link to the frame 102 at or near an intersection of a seat tube 142 and a down tube 144 of the frame 102. In the illustrated example, the rocker 140 is pivotally coupled to the seat tube 142 of the frame 102. An upper end of the rear triangle(s) 138 is/are pivotally coupled to one end of the rocker 140. The other end of the rocker 140 is coupled to one end of the shock absorber 136 (e.g., via a bolt or pin). The other end of the shock absorber 136 is coupled to the down tube 144 (e.g., via a bolt or pin). If the rear wheel 106 is moved upward (such as when riding over a bump), the rocker 140 is rotated in the clockwise direction (in FIG. 1), which compresses the shock absorber 136. When the force is removed, the shock absorber 136 expands (rebounds), thereby moving the rear wheel 106 back downward to maintain traction with the surface 116. Thus, the shock absorber 136 is coupled between two sections of the frame 102 that are moveable relative to each other.

In some examples, the front fork 108 is also implemented as a front suspension component. For example, a spring can be integrated into one of the legs and a damper can be integrated into the other leg. Therefore, the front fork 108 and the shock absorber 136 absorb shocks and vibrations while riding the bicycle 100 (e.g., when riding over rough terrain). In other examples, the front fork 108 and/or the shock absorber 136 may be integrated into the bicycle 100 in other configurations or arrangements. Further, in other examples, the suspension system may employ only one suspension component (e.g., only the shock absorber 136) or more than two suspension components (e.g., an additional suspension component on the seat post 112) in addition to or as an alternative to the front fork 108 and the shock absorber 136.

While the example bicycle 100 depicted in FIG. 1 is a type of mountain bicycle, the example suspension components disclosed herein can be implemented on other types of bicycles. For example, the example suspension components disclosed herein may be used on road bicycles, as well as bicycles with mechanical (e.g., cable, hydraulic, pneumatic, etc.) and non-mechanical (e.g., wired, wireless) drive systems. The example suspension components disclosed herein may also be implemented on other types of two-wheeled, three-wheeled, and four-wheeled human powered vehicles. Further, the example suspension components disclosed herein can be used on other types of vehicles, such as motorized vehicles (e.g., a motorcycle, a car, a truck, etc.).

FIG. 2 is a schematic diagram of an example damper 200 that can be implemented on the bicycle 100 of FIG. 1. For example, the damper 200 can be integrated into the example shock absorber 136. An example of a physical implementation of the damper 200 is disclosed in further detail in connection with FIGS. 11-25. In the illustrated example of FIG. 2, the damper 200 includes a damper body 202 having a first end 204 and a second end 206 opposite the first end 204. The damper body 202 may be a cylindrical body having a circular cross-sectional shape. In other examples, the damper body 202 may have a differently shaped cross-section (e.g., square). The damper body 202 defines a chamber 208. In the illustrated example, the damper 200 includes a shaft 210 (also referred to as a damper rod or stem) that extends into the damper body 202. In particular, the second end 206 of the damper body 202 has an opening 212 with a seal 214. The shaft 210 extends through the opening 212 and the seal 214 and into the chamber 208. The shaft 210 is moveable (e.g., slidable) through the opening 212 into and out of the damper body 202 as the damper 200 compresses and rebounds.

In the illustrated example, the damper 200 includes a damper member 216 disposed the damper body 202. The damper member 216 may also be referred to as a flow control member. The damper member 216 is disposed in the chamber 208 and coupled to the shaft 210. The damper member 216 includes a piston 218. The damper member 216 is moveable in the damper body 202. In particular, the damper member 216 is slidable along an inner surface 220 of the damper body 202. The damper member 216 is sealingly engaged with the inner surface 220. As such, the damper member 216 divides the chamber 208 into a first chamber 222 (e.g., the section of the chamber 208 above the damper member 216) and a second chamber 224 (e.g., the section of the chamber 208 below the damper member 216). The volumes of the chambers 222, 224 change as the damper member 216 moves up and down in the damper body 202. The first and second chambers 222, 224 are filled with fluid. The fluid may be, for example, oil, such as a mineral oil based damping fluid. In other examples, other types of damping fluids may be used (e.g., silicone or glycol type fluids). The damper member 216 controls fluid flow between the first chamber 222 and the second chamber 224. In particular, the damper member 216 controls the flow of fluid across the piston 218 and between the first and second chambers 222, 224 to dampen movement of the shock absorber.

In the illustrated example of FIG. 2, the damper 200 includes an internal floating piston (IFP) 226 that is slidably disposed within the damper body 202. A seal 228 is disposed between the IFP 226 and the inner surface 220 of the damper body 202. As shown in FIG. 2, the IFP 226 separates the fluid in the first chamber 222 from a pneumatic pressure chamber 230 having a pneumatic fluid. The pneumatic fluid may be a compressible fluid, such as air or nitrogen, while the fluid in the first chamber 222 may be an incompressible fluid, such as oil. The IFP 226 is moveable upward or downward based on the pressure differential across the IFP 226. The IFP 226 provides pressure on the fluid (e.g., oil) in the first chamber 222 to force the fluid through the flow paths in the piston 218 and prevent cavitation on the piston 218. The IFP 226 also compensates for the volume that the shaft 210 consumes when inserted into the damper body 202 (e.g., during assembly). The damper 200 includes a valve 232 to add or remove pneumatic fluid from the pneumatic pressure chamber 230. In other examples, instead of an IFP, the damper 200 may include a flexible bladder to separate the compressible and incompressible fluids. As another example, the damper 200 may include an open damping chamber with no physical separation, where the compressible fluid is on top and the incompressible fluid is on the bottom and gravity maintains the separation.

In the illustrated example, the chamber 208 has a first section 234 with a first cross-sectional area and a second section 236 with a second cross-sectional area that is greater than the first cross-sectional area. Because the damper body 202 has a circular cross-section, the first and second cross-sectional areas can also be defined by diameters. For example, the first section 234 has a first diameter and the second section 236 has a second diameter that is greater than the first section 234. In the illustrated example, the second section 236 having the larger cross-sectional area/diameter occurs closer to the second end 206. In this example, the second section 236 is shorter than the first section 234, but in other examples the lengths of the first and second sections 234, 236 may be different.

In operation, the first end 204 of the damper 200 may be coupled (directly or indirectly) to one frame member, and the shaft 210 may be coupled (directly or indirectly) to another frame member. As used herein, a compression stroke refers to the movement that occurs when the damper member 216 is moved (slid) toward the first end 204 of the damper body 202 and away from the second end 206 of the damper body 202. A compression stroke can be caused by any external force that moves the damper body 202 and the shaft 210 toward each other. This may occur, for example, when a rider rides over an object that causes the rear wheel 106 (FIG. 1) to be rotated upward toward the frame 102 (FIG. 1), when a rider comes down off of a jump and lands on the ground, etc. During a compression stroke, the shaft 210 is moved into the damper body 202, which moves the damper member 216 toward the first end 204 of the damper body 202. This movement causes an increased pressure of the fluid in the first chamber 222 and a decreased pressure of the fluid in the second chamber 224. During the compression stroke, fluid flows through one or more compression flow paths and across the piston 218 from the first chamber 222 to the second chamber 224, as disclosed in further detail herein. Conversely, as used herein, a rebound stroke refers to the movement that occurs when the damper member 216 is moved (slid) in the opposite direction, i.e., away from the first end 204 of the damper body 202 and toward the second end 206 of the damper body 202. The rebound movement may be driven by a spring (e.g., a coil spring, an air can) of the shock absorber and/or by the frame members moving apart. During a rebound stroke, the shaft 210 is moved out of the damper body 202, which moves the damper member 216 toward the second end 206 of the damper body 202. This movement causes an increased pressure of the fluid in the second chamber 224 and a decreased pressure of the fluid in the first chamber 222. During the rebound stroke, fluid flows through one or more rebound flow paths and across the piston 218 from the second chamber 224 to the first chamber 222. The damper member 216 is configured to control the flow of fluid through or across the piston 218 between the first and second chambers 222, 224, thereby damping movement of the shock absorber. As disclosed in further detail herein, the damper member 216 includes a unique arrangement of compression flow paths that provide varying levels of compression damping based on the position of the damper member 216.

The damper member 216 is moveable between a top-out position and a bottom-out position, which form the upper and lower limits of the movement of the damper member 216. In FIG. 2, the damper member 216 is shown in the top-out position, which means the damper 200 is fully extended or uncompressed. In some examples, in the top-out position, the damper member 216 is engaged with a structure such as the second end 206, which prevents further movement of the damper member 216 in one direction. During compression, the damper member 216 can be moved upward to the bottom-out position, which refers to the limit at which the damper 200 is fully compressed. The bottom-out position may correspond to a position where pressure in the chamber 208 prevents the damper member 216 from moving upward and/or where the damper member 216 engages a structure, such as the IFP 226.

FIG. 3 is an enlarged view of the callout 238 in FIG. 2. The piston 218 of the damper member 216 has a first end 300, a second end 302 opposite the first end 300, and an outer side surface 304 between the first and second ends 300, 302. At least a portion of the outer side surface 304 of the piston 218 is sealingly engaged (directly or via one or more seals) with the inner surface 220 of the damper body 202 along the first section 234 (FIG. 2) to limit fluid flow between the piston 218 and the inner surface 220 of the damper body 202. This sealing engagement separates the chamber 208 into the first chamber 222 and the second chamber 224.

In the illustrated example, the piston 218 has a first port, referred to herein as a primary compression port 306, that extends between the first and second ends 300, 302 of the piston 218. The damper member 216 includes a first valve 308, referred to herein as a primary compression valve 308, in the primary compression port 306 to control fluid flow through the primary compression port 306. The piston 218 also has or defines a second port 310, referred to herein as a rebound port 310, between the first and second ends 300, 302 with a second valve 312, referred to herein as a rebound valve 312, in the rebound port 310 to control fluid flow through the rebound port 310. The primary compression port 306 and the rebound port 310 may be formed by any number of passages, conduits, channels, etc. The primary compression valve 308 and the rebound valve 312 are check valves (sometimes referred to as one-way valves), which allow fluid flow in one direction but not the opposite direction. In particular, the primary compression valve 308 allows fluid flow through the primary compression port 306 from the first chamber 222 to the second chamber 224, but not from the second chamber 224 to the first chamber 222. Conversely, the rebound valve 312 allows fluid flow through the rebound port 310 from the second chamber 224 to the first chamber 222, but not from the first chamber 222 to the second chamber 224.

In the illustrated example, the piston 218 also has or defines a third port 314, referred to herein as a bypass compression port 314, which defines a flow path between the first end 300 and the outer side surface 304. In the illustrated example, the bypass compression port 314 extends between a portion of the primary compression port 306 and the outer side surface 304 of the piston 218. However, in other examples, the bypass compression port 314 can be a separate port that extends between the first end 300 and the outer side surface 304. The bypass compression port 314 may be formed by any number of passages, conduits, channels, etc. The bypass compression port 314 exits out of the outer side surface 304 rather than the second end 302. In the position shown in FIG. 3, the exit of the bypass compression port 314 is aligned with the second section 236 of the chamber 208. The damper member 216 includes a third valve 316, referred to herein as a bypass compression valve 316, in the bypass compression port 314 to control fluid flow through the bypass compression port 314. The bypass compression valve 316 is a check valve, which allows fluid flow through the bypass compression port 314 from the first end 300 to the outer side surface 304, but not from the outer side surface 304 to the first end 300. In this example, the bypass compression valve 316 has a lower cracking pressure than the primary compression valve 308. As such, the bypass compression valve 316 allows fluid from the first chamber 222 to the second chamber 224 during the initial part of the compression stroke, which allows the damper 200 to compress more quickly during the initial part of the compression stroke.

Figure 4:
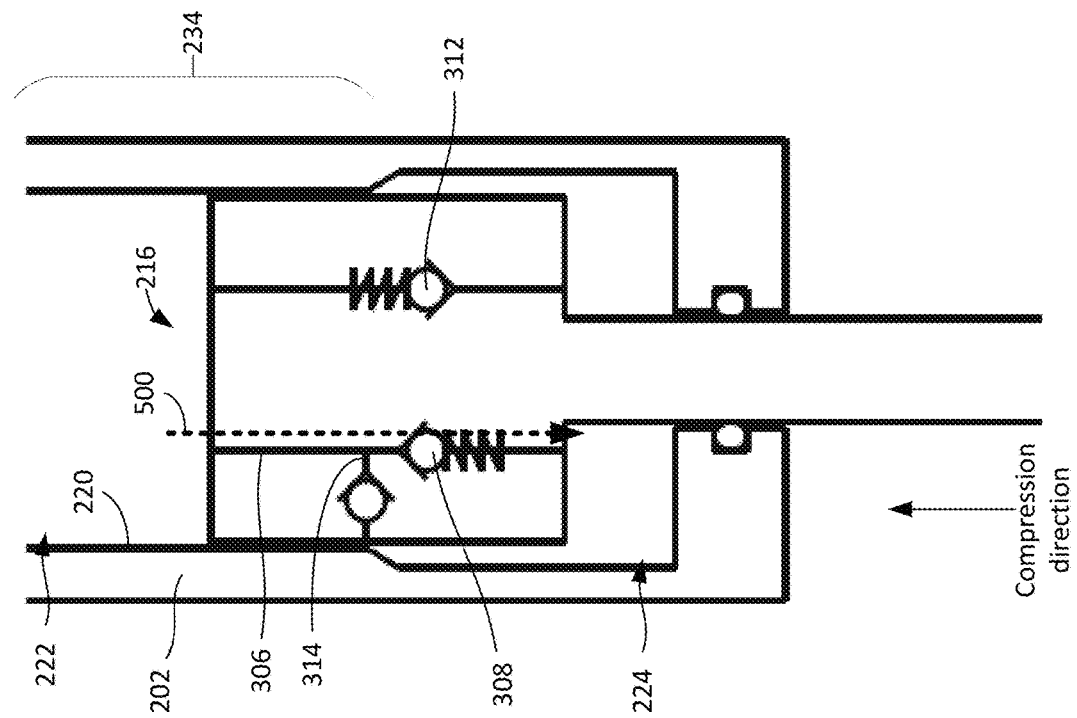
FIG. 4 illustrates the example damper member of FIG. 3 showing a first compression flow path during a first portion of travel of the example damper member during a compression stroke.

For example, FIG. 4 illustrates a first compression flow path 400 (shown as a dotted line) along which fluid flows during a first portion of the travel of the damper member 216 during a compression stroke. The first compression flow path 400 defines a flow path across the piston 218 from the first chamber 222 to the second chamber 224. In FIG. 4, the piston 218 is shown in the top-out position. In this position, the outlet of the bypass compression port 314 is aligned with or open to the second section 236 of the chamber 208 in the damper body 202. When a compressive force is applied to the shaft 210, the piston 218 is forced upward in the damper body 202. This increases the pressure in the first chamber 222 to be greater than the second chamber 224. The pressure differential between the first and second chambers 222, 224 overcomes the cracking pressure of the bypass compression valve 316 and opens the bypass compression valve 316. As such, fluid from the first chamber 222 flows through a portion of the primary compression port 306, through the bypass compression port 314 and the bypass compression valve 316, and to the second chamber 224 along the first compression flow path 400. Because the bypass compression valve 316 has a lower cracking pressure than the primary compression valve 308, this allows the damper 200 to compress more quickly when a shock or impulse is encountered. During this initial movement of the damper member 216, the pressure differential may not be enough to overcome the cracking pressure of the primary compression valve 308, so the primary compression valve 308 remains closed during the first portion of travel of the damper member 216. Further, during a compression stroke, the rebound valve 312 remains closed.

Figure 5:
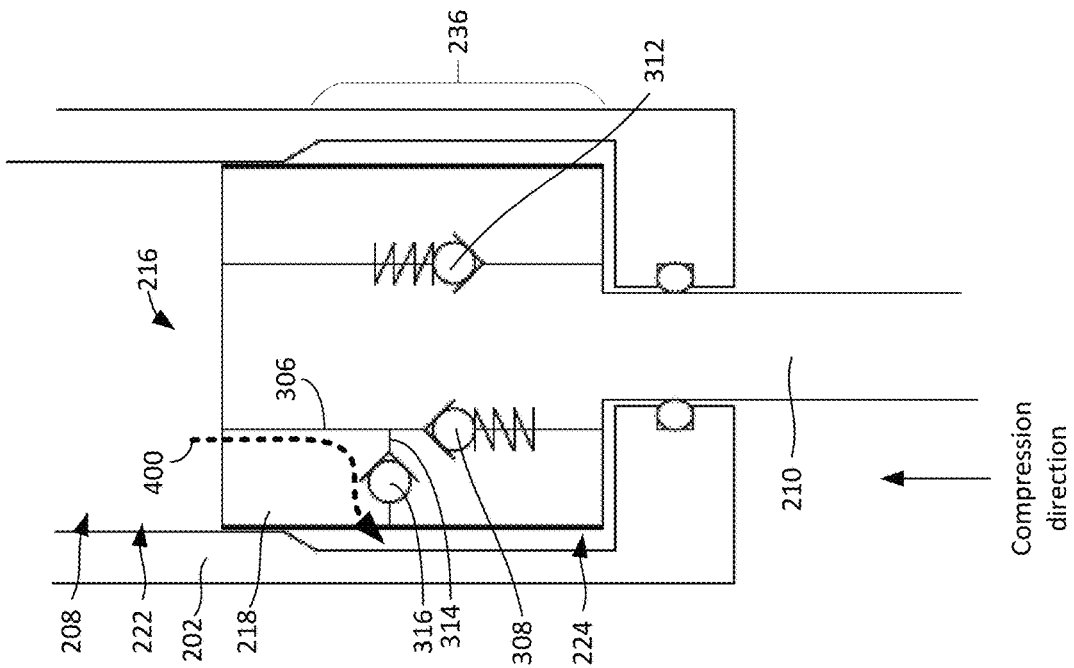
FIG. 5 illustrates the example damper member of FIG. 3 showing a second compression flow path during a second portion of travel of the example damper member during a compression stroke.

FIG. 5 illustrates a second compression flow path 500 (shown as a dotted line) along which fluid flows during a second portion of the travel of the damper member 216 during the compression stroke. As shown in FIG. 5, the damper member 216 has moved upward in the chamber 208 relative to the position shown in FIG. 4. The bypass compression port 314 is aligned with the first section 234 and blocked by the inner surface 220 of the damper body 202. Therefore, the first compression flow path 400 (FIG. 4) is blocked or obstructed, and the bypass compression valve 316 remains closed during the second portion of travel of the damper member 216. Instead, the pressure differential between the first and second chambers 222, 224 overcomes the cracking pressure of the primary compression valve 308 and opens the primary compression valve 308. As such, fluid from the first chamber 222 flows through the primary compression port 306 and the primary compression valve 308 to the second chamber 224 along the second compression flow path 500. Fluid continues to flow along the second compression flow path 500 as the damper member 216 is moved further upward in the damper body 202. For example, as shown in FIG. 6, the damper member 216 has been moved further upward in the damper body 202 during the compression stroke. The fluid continues to flow along the second compression flow path 500. During this second portion of travel of the compression stroke, the rebound valve 312 remains closed.

Therefore, during the first portion of travel of the damper member 216 during a compression stroke, the bypass compression valve 316 opens to enable fluid flow through the bypass compression port 314 from the first chamber 222 to the second chamber 224, and during the second portion of travel of the damper member 216 during the compression stroke, the primary compression valve 308 opens to enable fluid flow through the primary compression port 306 from the first chamber 222 to the second chamber 224. The first portion of travel corresponds to movement of the damper member 216 from the top-out position shown in FIG. 4 to the position shown in FIG. 5, and the second portion of travel corresponds to movement of the damper member 216 from the position shown in FIG. 5 to the bottom-out position (or any position the damper member 216 stops before rebound). During the first portion of travel of the damper member 216, fluid flows along the first compression flow path 400, and during the second portion of the damper member 216 during the compression stroke, fluid flows along the second compression flow path 500. The first compression flow path 400 has a larger cross-sectional flow area that results in little damping, whereas the second compression flow path 500 has a smaller cross-sectional flow are that results in greater damping. Therefore, during the first portion of travel, the damper 200 provides less resistance or damping, whereas during the second portion of travel, the damper 200 provides more resistance or damping. The transition between the first and second portion of travel occurs where the cross-sectional area of the chamber 208 changes. In other examples, this transition can be achieved by a dimple or slot along the inner surface 220 and/or a port (e.g., a channel) formed in the damper body 202. The distance or length of the first and second travel portions can be configured based the length of the first and second sections 234, 236, the size of the piston 218, and/or the location of the bypass compression port 314.

FIG. 7 illustrates a rebound flow path 700 (shown as a dotted line) along which fluid flows during a rebound stroke. When a rebound force is applied to the shaft 210, the piston 218 is forced downward in the damper body 202. The pressure differential between the first and second chambers 222, 224 opens the rebound valve 312. As such, fluid from the second chamber 224 flows through the rebound port 310 and the rebound valve 312 to the first chamber 222 along the rebound flow path 700. During rebound, the primary compression valve 308 and the bypass compression valve 316 remain closed.

In some examples, the damper 200 is adjustable to change the distance or stroke length that corresponds to the first portion of the travel of the compression stroke. For example, in FIG. 8, the damper 200 includes an example sleeve 800 in the damper body 202. The sleeve 800 is threadably engaged with a threaded section 802 on the inner surface 220 of the damper body 202. The piston 218 is sealingly engaged (e.g., directly or indirectly) with the sleeve 800. The sleeve 800 forms the inner surface of the damper body 202 along the first section 234 with the first cross-sectional area, and the section of the damper body 202 between the sleeve 800 and the second end 206 of the damper body 202 forms the second section 236 with the second cross-sectional area. The distance D1 between the bypass compression port 314 and the first section 234 (i.e., the start of the sleeve 800) corresponds to the first travel portion in which the bypass compression valve 316 is open to enable fluid flow along the first compression flow path 400 (FIG. 4).

The sleeve 800 is moveable to adjust a length of the first section 234 and a length of the second section 236, thereby changing the distance or length of the first and second travel portions. For example, as shown in FIG. 9, the sleeve 800 has been moved downward in the damper body 202. This may occur by rotating (e.g., screwing) the sleeve 800 relative to the damper body 202. As shown in FIG. 9, the distance D2 between the bypass compression port 314 and the first section 234 is less than the distance D1 in FIG. 8. As such, in the configuration in FIG. 9, the first portion of the travel is less than the first portion of the travel in the configuration of FIG. 8. In FIG. 10, the sleeve 800 has been moved further downward in the damper body 202. The distance D3 between the bypass compression port 314 and the first section 234 is less than the distance D1 in FIG. 8 and less than the distance D2 in FIG. 9. As such, in this configuration, the first travel portion is relatively short. A user (e.g., a rider) can adjust the sleeve based on their desired damping preference. Adjusting the position of the sleeve 800 does not affect the overall length of the damper 200. As such, the damper 200 can continue to be used in the same spaces. However, in other examples, the overall length of the damper 200 may be changed. In some examples, adjusting the sleeve 800 involves disassembling at least a portion of the damper 200. In other examples, one or more mechanisms can be provided to enable a user to adjust the position of the sleeve 800 without disassembly. For example, a worm gear can be disposed on the sleeve 800 and accessed from outside of the damper body 202, one or more tool access ports can be provided on the damper body 202, and/or one or more electric motors or actuators can be provided.

In examples of FIGS. 2-10, the bypass compression port 314 and the bypass compression valve 316 form a first means for allowing fluid flow across the piston 218 from the first chamber 222 to the second chamber 224 during a first portion of travel of the damper member 216 during a compression stroke. The primary compression port 306 and the primary compression valve 308 form a second means for allowing fluid flow across the piston 218 from the first chamber 222 to the second chamber 224 during a second portion of travel during a compression stroke. The first means (i.e., the bypass compression port 314 and the bypass compression valve 316) provide less fluid resistance than the second means (i.e., primary compression port 306 and the primary compression valve 308). In other examples, the first means may be provided by another configuration of channels, ports, valves, etc. In some examples, the damper 200 includes means for controlling a length of the first portion of the travel, such as the sleeve 800.

FIGS. 11 and 12 illustrate an example shock absorber 1100 (a suspension component) constructed in accordance with the teachings of this disclosure. The example shock absorber 1100 can be implemented as the shock absorber 136 and used on the bicycle 100 of FIG. 1. For example, the shock absorber 1100 can be coupled between the frame 102 and the rocker 140 to absorb vibrations and shocks from the rear wheel 106. In the illustrated example of FIGS. 11 and 12, the shock absorber 1100 includes an integrated spring 1102 and damper 1104. The spring 1102 operates (by compressing or expanding) to absorb vibrations or shocks, while the damper 1104 operates to dampen (slow) the movement of the spring 1102. The example damper 1104 can correspond to and/or implement the example features disclosed in connection with the example damper 200 of FIGS. 2-10.

In the illustrated example, the spring 1102 is implemented as a coil spring. However, in other examples, the spring 1102 may be implemented as another type of spring, such as an air can as shown in connection with FIG. 26. The spring 1102 and the damper 1104 are configured in a coaxial arrangement and aligned along an axis 1106, which corresponds to a central or longitudinal axis of the shock absorber 1100.

In the illustrated example, the damper 1104 includes a damper body 1108 and a shaft 1110 (also referred to as a damper rod or stem) that is moveable into and out of the damper body 1108. The shock absorber 1100 includes a cap 1112 that is coupled (e.g., threadably coupled) to the damper body 1108 and forms a first end (e.g., a top) of the damper body 1108. The cap 1112 includes a first attachment portion 1114. The distal end of the shaft 1110 includes a second attachment portion 1116. The first and second attachment portions 1114, 1116 (e.g., eyelets) are used for connecting the shock absorber 1100 between two components of a bicycle, such as two points on the frame 102 (FIG. 1) of the bicycle 100 (FIG. 1), the frame 102 and the rocker 140 (FIG. 1), and/or another intermediate part or component. In the illustrated example, the first and second attachment portions 1114, 1116 are aligned along the axis 1106.

In the illustrated example, the shock absorber 1100 includes a first spring retainer 1118 coupled to the damper body 1108 and a second spring retainer 1120 coupled to the shaft 1110. The spring 1102 is disposed between the first and second spring retainers 1118, 1120. During compression, the first and second attachment portions 1114, 1116 are pushed toward each other, which moves the shaft 1110 into the damper body 1108 and compresses the spring 1102 between the first and second spring retainers 1118, 1120. Conversely, during rebound, the first and second attachment portions 1114, 1116 are pushed (or and/or pulled) apart at least in part by force from the spring 1102, which moves the shaft 1110 out of the damper body 1108.

In the illustrated example of FIGS. 11 and 12, the damper 1104 includes an external reservoir 1122 (sometimes referred to as a shock can or shock piggy-back can). The external reservoir 1122 is disposed outside of the damper body 1108. The external reservoir 1122 is used to house excess damper fluid as the shock absorber 1100 compresses and/or rebounds. In particular, during compression and rebound, damper fluid is routed between the damper body 1108 and the external reservoir 1122. This type of shock absorber having an external reservoir has many advantages, such as for keeping nitrogen (or other pneumatic fluid) away from the main body of the shock absorber 1100, splitting the load of a shock between two compression circuits, and enabling the use of larger internal floating pistons. However, in other examples, the shock absorber 1100 may not include an external reservoir. Instead, the reservoir may be defined in the damper body 1108 or another area in the tubed structured.

Figure 13:
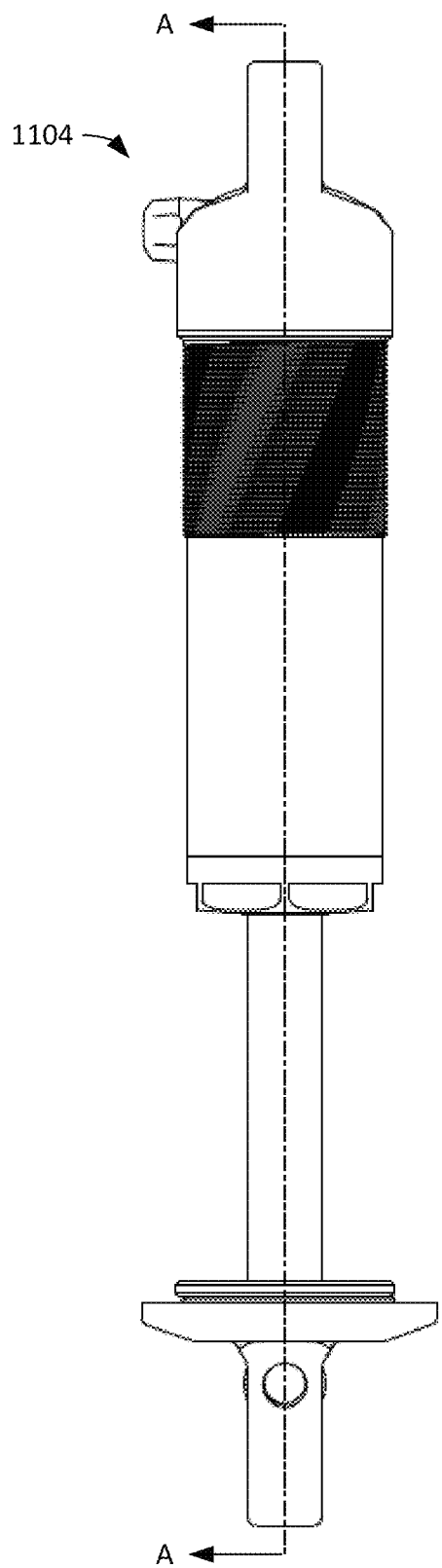
FIG. 13 is a side view of the example damper of the example shock absorber of FIG. 11.
Figure 14:
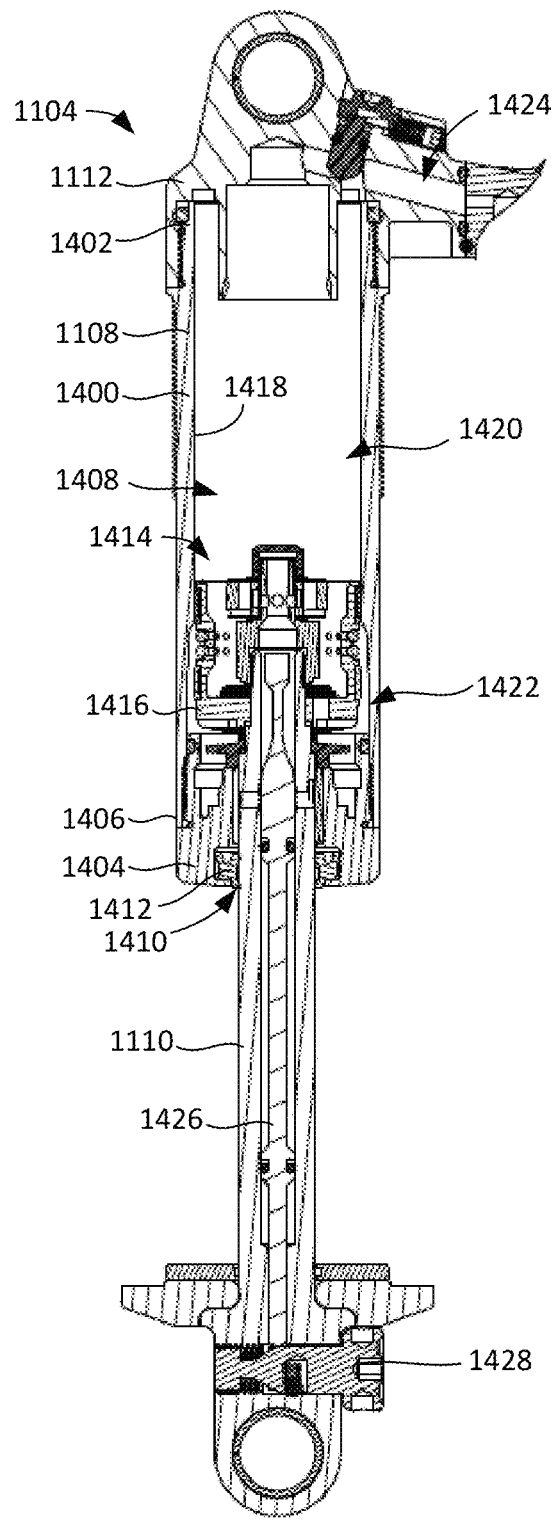
FIG. 14 is a cross-sectional view of the example damper taken along line A-A of FIG. 13.

FIG. 13 is a side view of the example damper 1104. In FIG. 13, the example spring 1102 and the example first spring retainer 1118 have been removed. FIG. 14 is a cross-sectional view of the example damper 1104 taken along line A-A of FIG. 13. As shown in FIG. 13, the damper body 1108 includes a sleeve or tube 1400. The cap 1112 is coupled to a first end 1402 of the sleeve 1400 and forms a first end (e.g. a top end) of the damper body 1108. Further, the damper body 1108 include an end cap 1404 that is coupled to a second end 1406 of the tube 1400 and forms a second end (e.g., a bottom end) of the damper body 1108.

In the illustrated example of FIG. 14, the damper body 1108 defines a chamber 1408. The chamber 1408 is filled with fluid. The fluid may be, for example, oil, such as a mineral oil based damping fluid. In other examples, other types of damping fluids may be used, such as silicone or glycol type fluids. In the illustrated example, the end cap 1404 has an opening 1410 with a seal 1412. The shaft 1110 extends through the opening 1410 and the seal 1412 and into the chamber 1408.

In the illustrated example of FIG. 14, the damper 1104 includes a damper member 1414 (which may also be referred to as a flow control member) disposed in the chamber 1408 and coupled to the shaft 1110. The damper member 1414 includes a piston 1416. The piston 1416 is movable in the damper body 1108. In particular, the piston 1416 is slidable along an inner surface 1418 of the tube 1400 of the damper body 1108. The damper member 1414 divides the chamber 1408 into a first chamber 1420 (which is on the top side of the damper member 1414 in FIG. 14) and a second chamber 1422 (which is on the bottom side of the damper member 1414 in FIG. 14). The damper member 1414 controls the flow of fluid across the piston 1416 between the first and second chambers 1420, 1422 in the damper body 1108, which affects the speed at which the shock absorber 1100 compresses and/or rebounds. The damper 1414 has a unique valve design that enables different damping rates during a compression stroke, as disclosed in further detail herein.

During a compression stroke, the shaft 1110 is moved into the damper body 1108, which moves the piston 1416 upward toward the cap 1112. This movement causes an increased pressure of the fluid in the first chamber 1420 and a decreased pressure of the fluid in the second chamber 1422. During the compression stroke, fluid flows through one or more compression flow paths and across the piston 1416 from the first chamber 1420 to the second chamber 1422, as disclosed in further detail herein. During a rebound stroke, the shaft 1110 is moved out of the damper body 1108, which moves the piston 1416 downward toward the end cap 1404. This movement causes an increased pressure of the fluid in the second chamber 1422 and a decreased pressure of the fluid in the first chamber 1420. During the rebound stroke, fluid flows through one or more rebound flow paths and across the piston 1416 from the second chamber 1422 to the first chamber 1420. The damper member 1414 is configured to control the flow of fluid through or across the piston 1416 between the first and second chambers 1420, 1422, thereby affecting the compression and rebound damping rates. As shown in FIG. 14, the cap 1112 has a passageway 1424 to enable fluid in the chamber 1408 to flow into and out of the external reservoir 1122 (FIGS. 11 and 12). In some examples, the external reservoir 1122 includes an internal floating piston, which separates the fluid from a pneumatic chamber, similar to the arrangement disclosed in connection with the damper 200 in FIG. 2. In the illustrated example, the damper 1104 includes a needle 1426 to adjust the rebound damping rate. The needle 1426 is coaxially disposed in the shaft 1100. The needle 1426 can be moved axially, via a knob 1428, to adjust the rebound flow rate across the damper member 1414.

Figure 15:
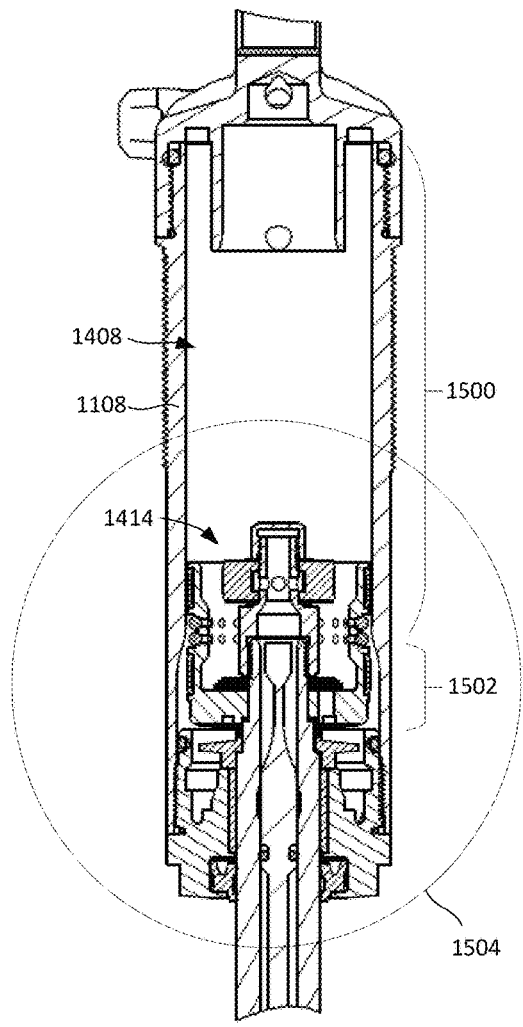
FIG. 15 is an enlarged view of an example damper body and an example damper member of the example damper of FIG. 14.

FIG. 15 is an enlarged view of the damper body 1108 and the damper member 1414 from FIG. 14. As shown in FIG. 15, the chamber 1408 of the damper body 1108 has a first section 1500 with a first cross-sectional area and a second section 1502 with a second cross-sectional area that is greater than the first cross-sectional area. The second section 1502 is near the second end 1406. Because the damper body 1108 has a circular cross-section, the first and second cross-sectional areas can also be defined by diameters. For example, the first section 1500 has a first diameter and the second section 1502 has a second diameter that is larger than the first section 1500. In this example, the second section 1502 is shorter than the first section 1500, but in other examples the lengths of the first and second sections 1500, 1502 may be different. In the illustrated example, the transition between the first cross-sectional area/diameter and the second cross-sectional area/diameter is gradual or tapered. In other examples, the transition may be more distinct (e.g., a 90° shoulder).

Figure 16:
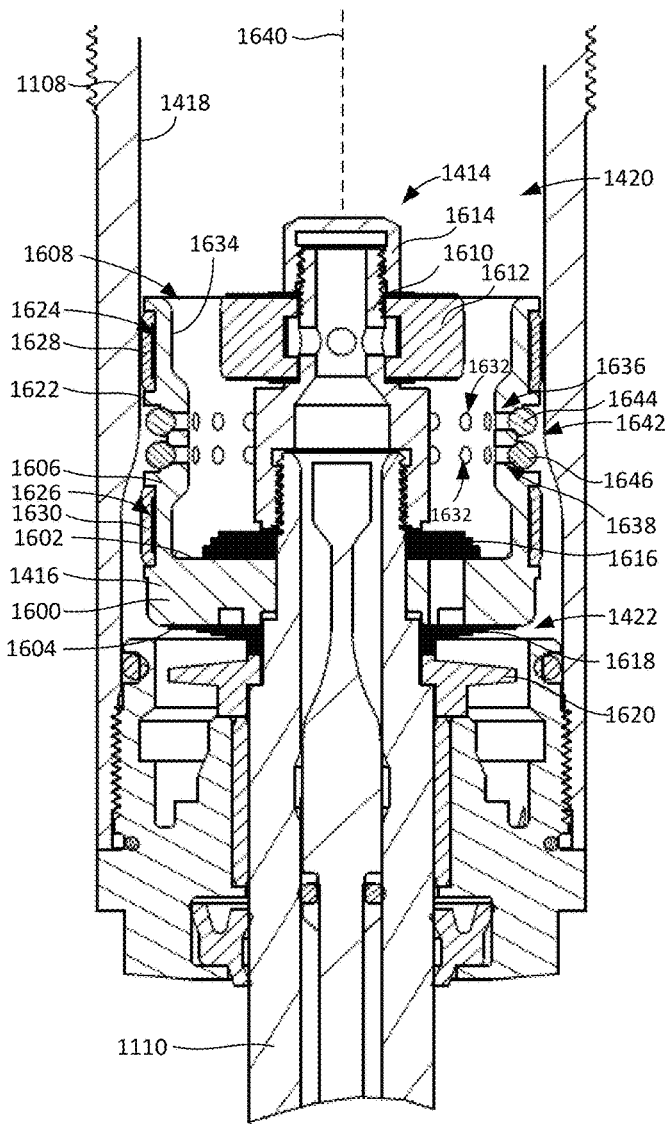
FIG. 16 is an enlarged view of the callout in FIG. 15 showing the example damper member.

FIG. 16 is enlarged view of the callout 1504 of FIG. 15. In the illustrated example, the piston 1416 includes a disc 1600 having a first side 1602 and a second side 1604 opposite the first side 1602. The piston 1416 includes a wall 1606 coupled to extending form the first side 1602. The 1606 forms a cavity 1608. In the illustrated example, the damper member 1414 includes a piston bolt 1610 that is threadably coupled to the shaft 1110, which couples the piston 1416 to the shaft 1110. The damper member 1414 includes a check plate 1612 and a nut 1614 coupled to the piston bolt 1610. In the illustrated example, the damper member 1414 has a rebound shim stack 1616 on the first side 1602 of the disc 1600 of the piston 1416 and a compression shim stack 1618 on the second side 1604 of the disc 1600 of the piston 1416. The rebound shim stack 1616 is clamped between the piston bolt 1610 and the first side 1602 of the disc 1600. The compression shim stack 1618 is clamped between a retainer 1620 and the second side 1604 of the disc 1600.

The piston 1416 is sealingly engaged with the inner surface 1418 of the damper body 1108. In this example, an outer surface 1622 of the piston 1416 has a first seal groove 1624 (e.g., a gland) and a second seal groove 1626 axially spaced from the first seal groove 1624. The damper member 1414 includes a first seal 1628 disposed in the first seal groove 1624 and around the piston 1416. The damper member 1414 also includes a second seal 1630 disposed in the second seal groove 1626 and around the piston 1416. In some examples, the first and second seals 1628, 1630 are implemented as wearbands constructed of polytetrafluoroethylene (commonly referred to as Teflon). In other examples, the wearbands can be constructed of other polymers and/or materials. In some examples, the wearbands are continuous bands that are installed by stretching the wearbands over the piston 1416, and then are compressed (sized) into place. In other examples, the wearbands may have a split, and can be installed by spreading apart the ends of the split and/or stretching the wearbands over the piston 1416. In other examples, the seals 1628, 1630 can be constructed as other types of seals. As shown in FIG. 16, the first seal 1628 is engaged with the inner surface 1418 of the damper body 1108, which prevents fluid flow between the outer surface 1622 of the piston 1416 and the inner surface 1418 of the damper body 1108, thereby fluidly separating the first and second chambers 1420, 1422. The first seal 1628 remains engaged with the inner surface 1418 of the damper body 1108 as the damper member 1414 moves up and down during compression and rebound. In the position shown in FIG. 16, the second seal 1630 is not engaged with the inner surface 1418. However, as disclosed in further detail herein, when the piston 1416 is moved upward, the second seal 1630 engages the inner surface 1418 for a portion of the travel during the compression stroke.

In the illustrated example, the piston 1416 has a plurality of radial openings 1632 (two of which are referenced in FIG. 16). In this example, the radial openings 1632 are distributed circumferentially around the wall 1606 of the piston 1416. The radial openings 1632 extend through the wall 1606 between the outer surface 1622 of the wall 1606 and an inner surface 1634 of the wall 1606. The radial openings 1632 enable fluid flow between the second chamber 1422 and the cavity 1608. The radial openings 1632 are axially spaced between the first and second seals 1628, 1630. Any number of radial openings may be provided (e.g., one, two, three, etc.). In this example, the radial openings 1632 include are arranged in a first set 1636 (e.g., a first ring) and a second set 1638 (e.g., a second ring) that are axially spaced apart. However, in other examples, the piston 1416 may include only one set or ring of radial openings. In some examples, the radial openings 1632 are spaced equidistant from one another. In the illustrated example, the radial openings 1632 are circular shaped. In other examples, the radial openings 1632 can be shaped differently (e.g., square, triangular, polygonal, etc.). In this example, the radial openings 1632 are aligned along axes that are transverse (e.g., perpendicular) to an axis of movement 1640 along which the damper member 1414 moves (e.g., up and down in FIG. 16). Therefore, the radial openings 1632 define flow paths that are transverse to the axis of movement 1640. In some examples, the radial openings 1632 are aligned along axes that are radial (perpendicular) to the axis of movement 1640 of the damper member 1414.

In the illustrated example, the outer surface 1622 of the piston 1416 has a recess 1642 between the first and second seal groves 1624, 1626. In the illustrated example, the damper member 1414 includes a first ring 1644 and a second ring 1646 disposed around the wall 1606 of the piston 1416. In particular, the first ring 1644 is disposed in the recess 1642 and aligned with the first set 1636 of the radial openings 1632, and the second ring 1646 is disposed around the wall 1606 and aligned with the second set 1638 of the radial openings 1632. In other examples, the piston 1416 may include only one set of radial openings, in which case the damper member 1414 may include only one ring. The first and second rings 1644, 1646 are radially expandable and act as check valves, as disclosed in further detail herein. In some examples, the first and second rings 1644, 1646 are implemented as o-rings.

Figure 17:
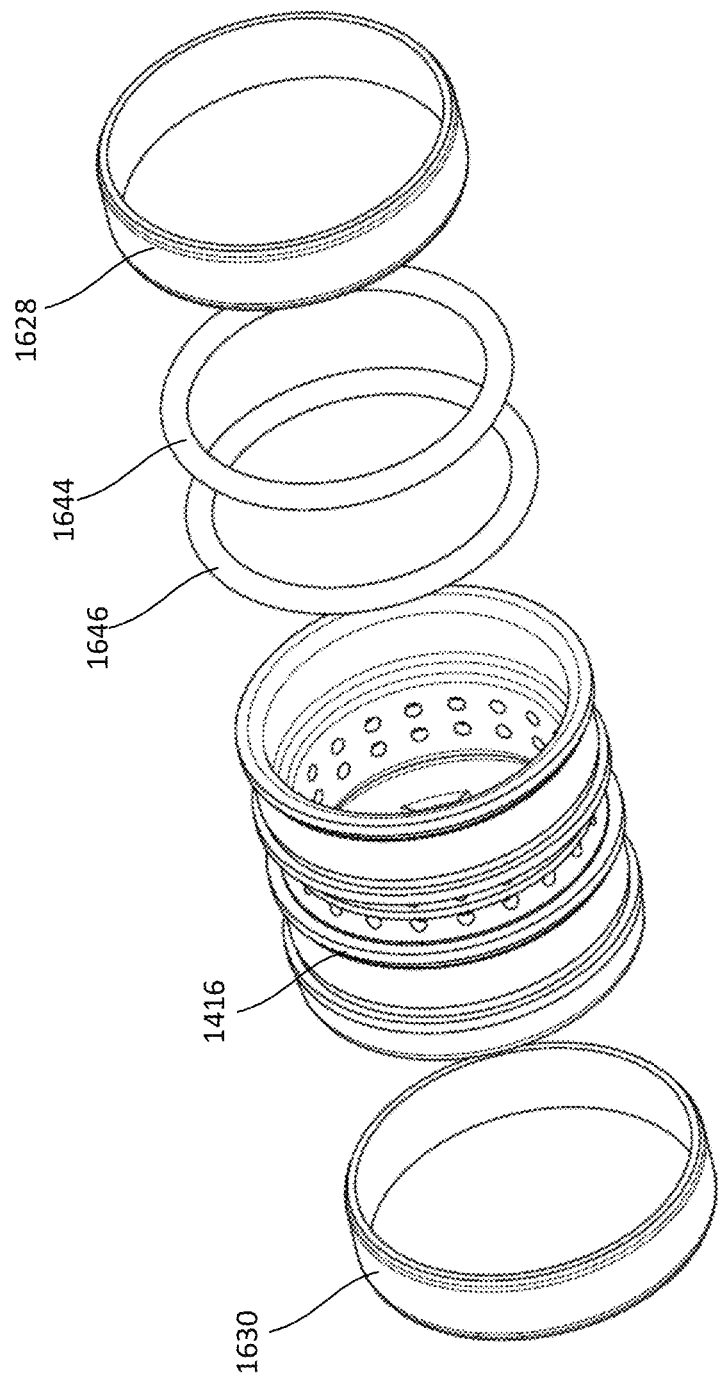
FIG. 17 is an exploded view of an example piston, example seals, and example rings of the example damper member of FIG. 15.
Figure 18:
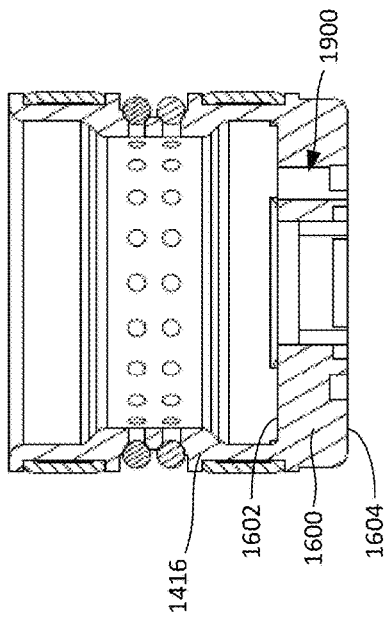
FIG. 18 is a side view of the example piston, the example seals, and the example rings of FIG. 17 in an assembled state.
Figure 19:
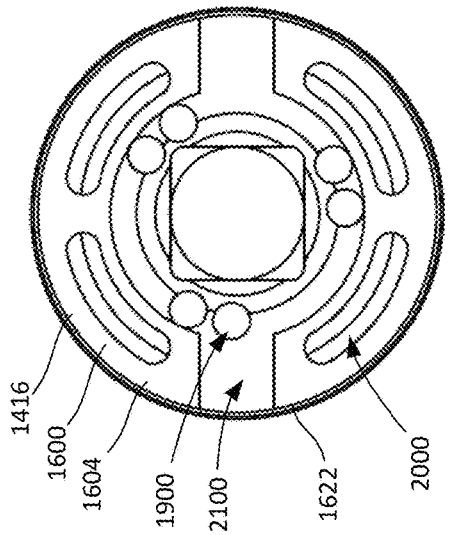
FIG. 19 is a cross-sectional view taken along line B-B of FIG. 18.
Figure 20:
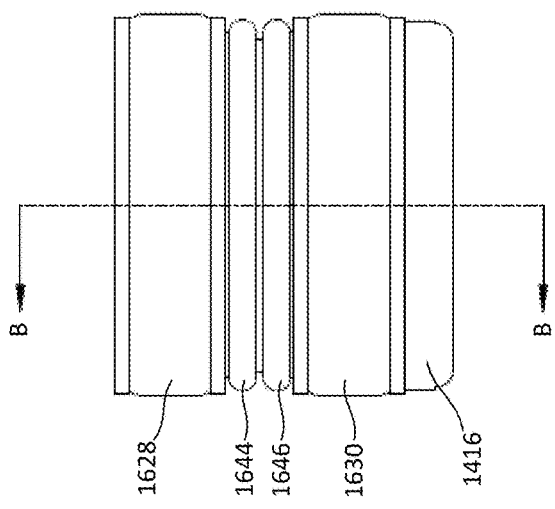
FIG. 20 is a top view of the example piston of FIG. 17.
Figure 21:
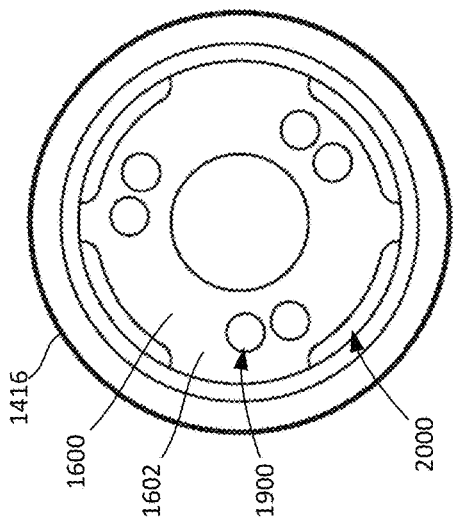
FIG. 21 is a bottom view of the example piston of FIG. 17.

FIG. 17 is an exploded view of the piston 1416, the first and second seals 1628, 1630, and the first and second rings 1644, 1646. FIG. 18 is a side view of the piston 1416 with the first and second seals 1628, 1630 and the first and second rings 1644, 1646 on the piston 1416. FIG. 19 is a cross-sectional view of the piston 1416 taken along line B-B of FIG. 18. FIG. 20 is a top view of the piston 1416 and FIG. 21 is a top view of the piston 1416. As shown in FIGS. 19, 20, and 21, the disc 1600 defines a plurality of rebound channels 1900 (one of which is referenced in each of FIGS. 19, 20, and 21) extending through the disc 1600 between the first side 1602 and the second side 1604. The disc 1600 may have any number of rebound channels 1900 (e.g., one, two, three, etc.). As shown in FIG. 21, the second side 1604 defines a recess or slot 2100 that extends from the outer surface 1622 to the rebound channels 1900. As shown in FIGS. 20 and 21, the disc 1600 also defines a plurality of compression channels 2000 (one of which is referenced in FIGS. 20 and 21) extending through the disc 1600 between the first side 1602 and the second side 1604. The disc 1600 may have any number of compression channels 2000 (e.g., one, two, three, etc.). When the damper member 1414 is assembled, the rebound shim stack 1616 (FIG. 16) is disposed on the first side 1602 of the disc 1600 and covers the rebound channels 1900, but not the compression channels 2000. Further, when the damper member 1414 is assembled, the compression shim stack 1618 (FIG. 16) is disposed on the second side 1604 of the disc 1600 and covers the compression channels 2000, but fluid can still flowthrough the slot 2100 (from the outer surface 1622) and into the compression channels 2000. Therefore, the rebound shim stack 1616 and the compression shim stack 1618 form check valves.

Figure 22:
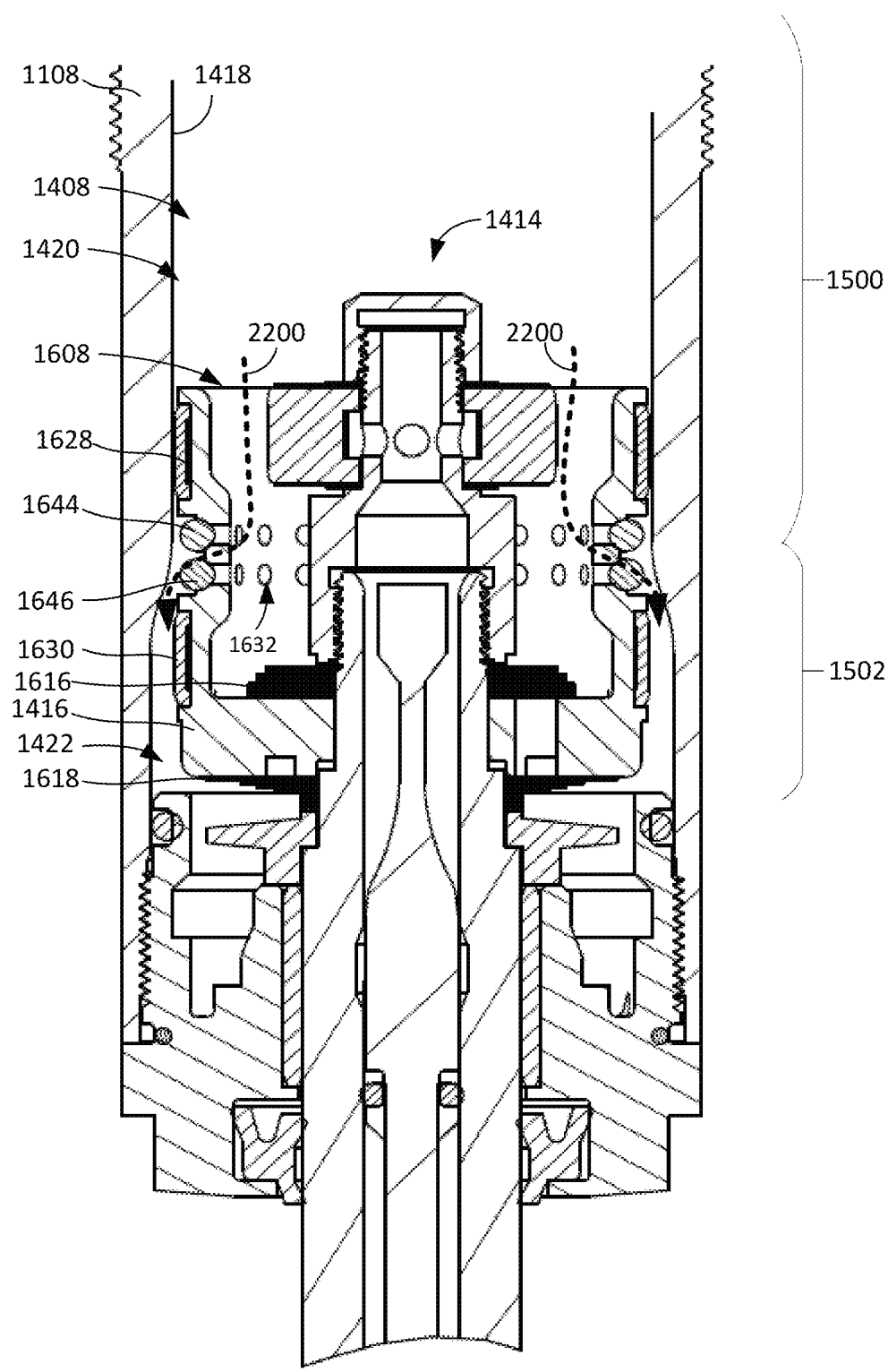
FIG. 22 illustrates the example damper member of FIG. 16 showing a first compression flow path during a first portion of travel of the example damper member during a compression stroke.

FIG. 22 illustrates a first compression flow path 2200 (shown as dotted lines) along which fluid flows during a first portion of the travel of the damper member 1414 during a compression stroke. The first compression flow path 2200 defines a flow path across the damper member 1414 from the first chamber 1420 to the second chamber 1422. In FIG. 22 the damper member 1414 is in the top-out position. In this position, the first seal 1628 is sealingly engaged with the inner surface 1418 of the damper body 1108 along the first section 1500 of the chamber 1408. However, because the second section 1502 has a larger cross-sectional area (e.g., diameter), the second seal 1630 is spaced apart from (not engaged with) the inner surface 1418 along the second section 1502 of the chamber 1408. During a compression stroke, the damper member 1414 is moved upward in the chamber 1408, which increases the pressure in the first chamber 1420 and decrease the pressure in the second chamber 1422. The pressure differential between the first and second chambers 1420, 1422 causes the rings 1644, 1646 to expand (e.g., exceeds the cracking pressure of the rings 1644, 1646), so that the fluid can flow past or around the rings 1644, 1646. This creates a flow path for the fluid to flow through the radial openings 1632 (one of which is referenced in FIG. 22) from the first chamber 1420 to the second chamber 1422. In particular, as the damper member 1414 is moved upward, fluid from the first chamber 1420 flows into the cavity 1608 in the piston 1416, through the radial openings 1632, around the rings 1644, 1646, and between the second seal 1630 and the inner surface 1418 into the second chamber 1422. The first and second rings 1644, 1646 form check valves. Therefore, the radial openings 1632 correspond to or form the bypass compression port 314 disclosed in connection with the damper 200 in FIG. 3, and the rings 1644, 1646 correspond to or form the bypass compression valve 316 disclosed in connection with the damper 200 in FIG. 3. During this first portion of travel, the compression shim stack 1618 remains closed. The cracking pressure of the rings 1644, 1646 is less than the cracking pressure of the compression shim stack 1618. In other words, the pressure differential needed to open or expand the rings 1644, 1646 (e.g., the cracking pressure) is less than the pressure differential needed to open the compression shim stack 1618. Therefore, the fluid flow bypasses the compression shim stack 1616 during the initial part of the compression stroke. This enables the damper member 1414 to compress more quickly. As disclosed above, the piston 1416 has two sets of radial openings 1632 that are radially spaced apart. The first (top) set of the radial openings 1632 are covered by the first ring 1644 and the second (lower) set are covered by the second ring 1646. In some examples, having two sets of radial openings increases flow through the piston 1416. Additionally, the axial spacing helps provide a smooth transition from one flow path to another flow path by closing/opening one ring 1644, 1646 at a time. During a compression stroke, the rebound shim stack 1616 remains closed.

Figure 23:
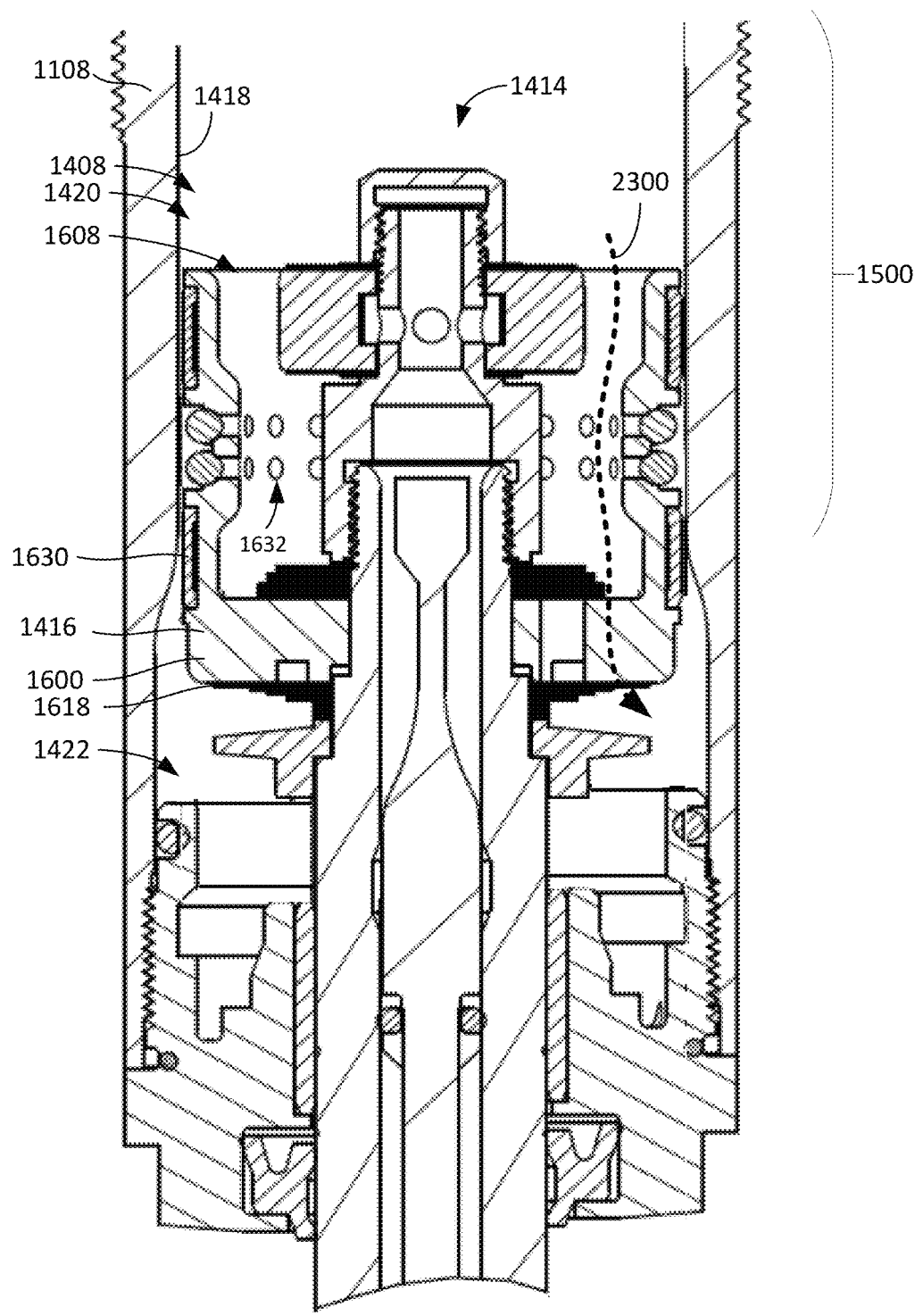
FIG. 23 illustrates the example damper member of FIG. 16 showing a second compression flow path during a second portion of travel of the example damper member during a compression stroke.

Once the damper member 1414 reaches a certain position during the compression stroke, the first compression flow path 2200 is blocked and fluid flows along a second compression flow path. For example, as shown in FIG. 23, the damper member 1414 has moved upward during the compression stroke. In the position shown in FIG. 23, the second seal 1630 is sealingly engaged with the inner surface 1418 of the damper body 1108 along the first section 1500 of the chamber 1408. This blocks or prevents fluid flow through the radial openings 1632 (one of which is referenced in FIG. 23) from the first chamber 1420 to the second chamber 1422. Instead, the pressure differential in the first and second chambers 1420, 1422 causes the compression shim stack 1618 to bend open, which enables fluid flow along a second compress flow path 2300 (shown as a dotted line). In particular, fluid from the first chamber 1420 flows into the cavity 1608 in the piston 1416, through the compression channels 2000 (FIGS. 20 and 21) in the disc 1600 of the piston 1416, past the compression shim stack 1618, and into the second chamber 1422. Therefore, the cavity 1608 and the compression channels 2000 correspond to or form the primary compression port 306 disclosed in connection with the damper 200 in FIG. 3, and the compression shim stack 1618 corresponds to or forms the primary compression check 308 disclosed in connection with the damper 200 of FIG. 3. The flow of fluid through the piston 1416 and across the compression shim stack 1618 dampens or slows the movement of the fluid, thereby dampening movement of the shock absorber 1100 (FIG. 11) during compression. The fluid continues to flow along the second compression flow path 2300 as the damper member 1414 moves upward in the damper body 1108 during the compression stroke.

The first seal 1628 is the primary seal that separates the first and second chambers 1420, 1422. The second seal 1630 is used for controlling compression damping by opening or closing the first compression flow path 2200. In some examples, the second seal 1630 is smaller than the first seal 1628 and has less sealing engagement with the inner surface 1418. This reduces (e.g., minimizes) any friction caused by the second seal 1430. Any leak past the second seal 1630 is stopped by the first seal 1628. However, in other examples, the second seal 1630 may be the same size as the first seal 1628.

Figure 24:
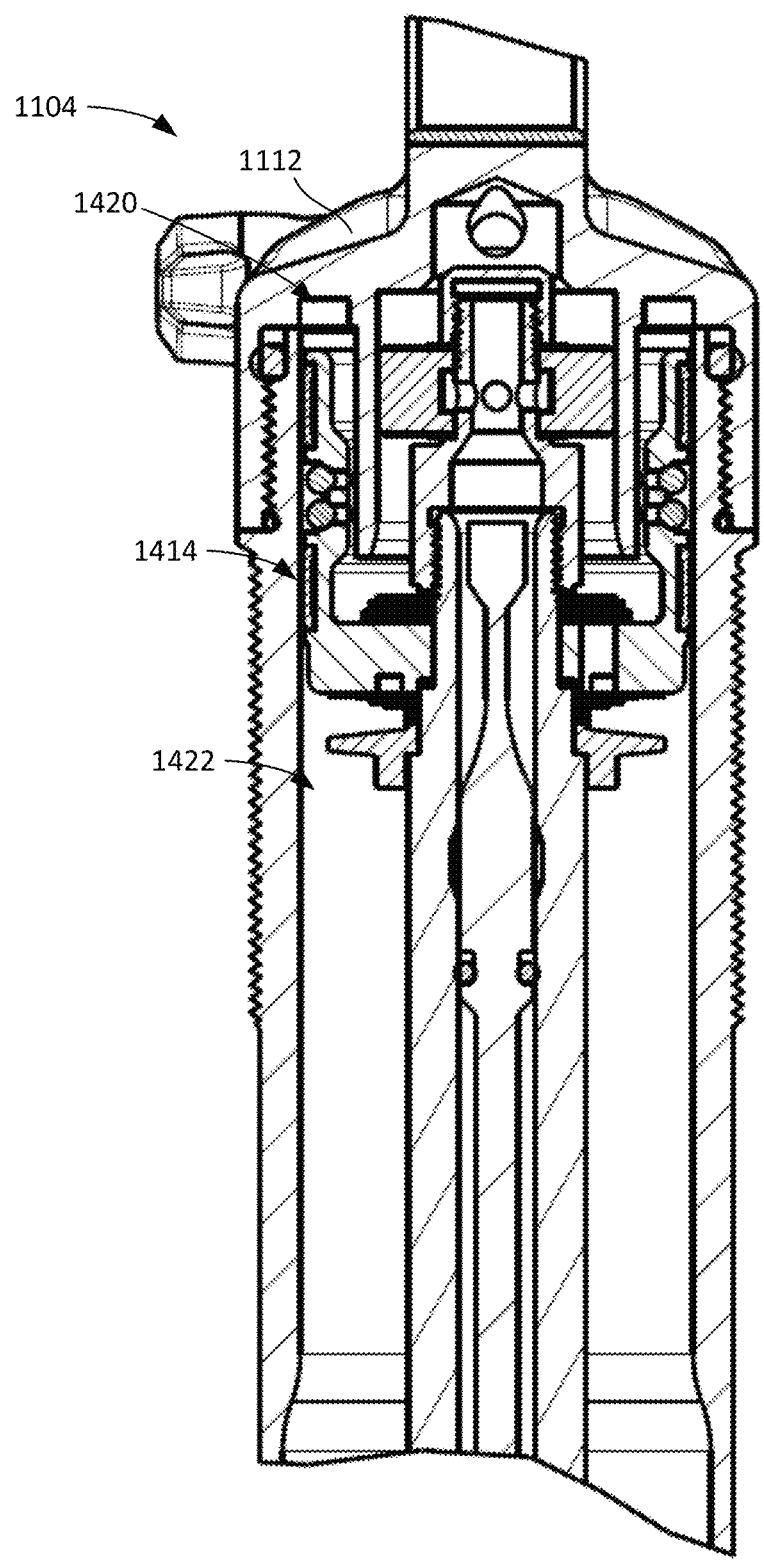
FIG. 24 illustrates the example damper member of FIG. 16 in a bottom-out position.

In some examples, the damper member 1414 reaches a bottom-out position, which is shown in FIG. 24. In some examples, the bottom-out position occurs when the spring 1102 (FIG. 11) is fully compressed. Therefore, the first portion of travel of the damper member 1414 corresponds to movement of the damper member 1414 from the top-out position shown in FIG. 22 to the position shown in FIG. 23, and the second portion of travel corresponds to movement of the damper member 1414 from the position shown in FIG. 23 to the bottom-out position shown in FIG. 24 (or any position where the damper member 1414 stops before rebound). During the first portion of travel of the damper member 1414, fluid flows along the first compression flow path 2200, and during the second portion of the damper member 1414, fluid flows along the second compression flow path 2300. During the first portion of travel, the damper 1104 provides less (e.g., minimal) resistance or damping, whereas during the second portion of travel, the damper 1104 provides more resistance or damping. The distance or length of the first and second portions can be configured based the length of the first and second sections 1500, 1502, the size of the piston 1416, the location of the second seal 1630, and/or one or more other parameters.

When the compressive force is removed, the shock absorber 1100 rebounds. As such, the damper member 1414 moves away from the cap 1112. This increases the pressure of the fluid in the second chamber 1422 and decreases the pressure of the fluid in the first chamber 1420. The damper member 1414 defines one or more rebound flow paths.

Figure 25:
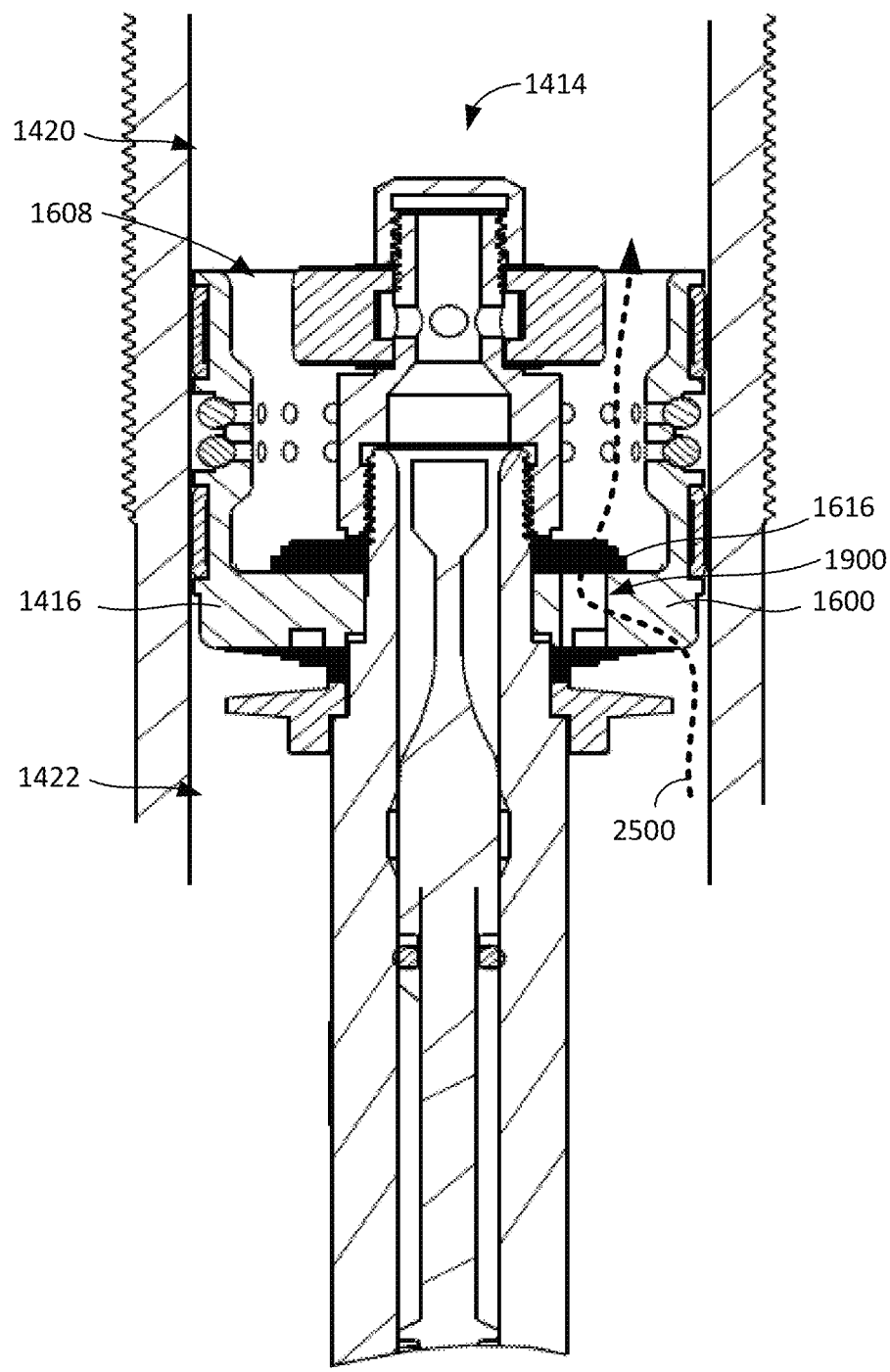
FIG. 25 illustrates the example damper member of FIG. 16 showing a rebound flow path during a rebound stroke.

FIG. 25 illustrates an example rebound flow path 2500 (shown as a dotted line) along which fluid flows across the damper member 1414 during a rebound stroke. The pressure differential between the first and second chambers 1420, 1422 causes the rebound shim stack 1616 to bend open, which enables fluid flow along the rebound flow path 2500. In particular, fluid flows from the second chamber 1422, through the slot 2100 (FIG. 21) and through the rebound channels 1900 in the disc 1600 of the piston 1416, past the rebound shim stack 1616, through the cavity 1608 of the piston 1416, and into the first chamber 1420. Therefore, the slot 2100, the rebound channels 1900, and the cavity 1608 correspond to or form the rebound port 310 disclosed in connection with the damper 200 in FIG. 3, and the rebound shim stack 1616 corresponds to or forms the rebound valve 312 disclosed in connection with the damper 200 of FIG. 3. The flow of fluid through the piston 1416 and across the rebound shim stack 1616 dampens or slows the movement of the fluid, thereby dampening movement of the shock absorber 1100 (FIG. 11) during rebound. During rebound, fluid flow is blocked from flowing along the first compression flow path 2200 by the rings 1644, 1646 and fluid flow is blocked from flowing along the second compression flow path 2300 by the compression shim stack 1618.

Figure 26:
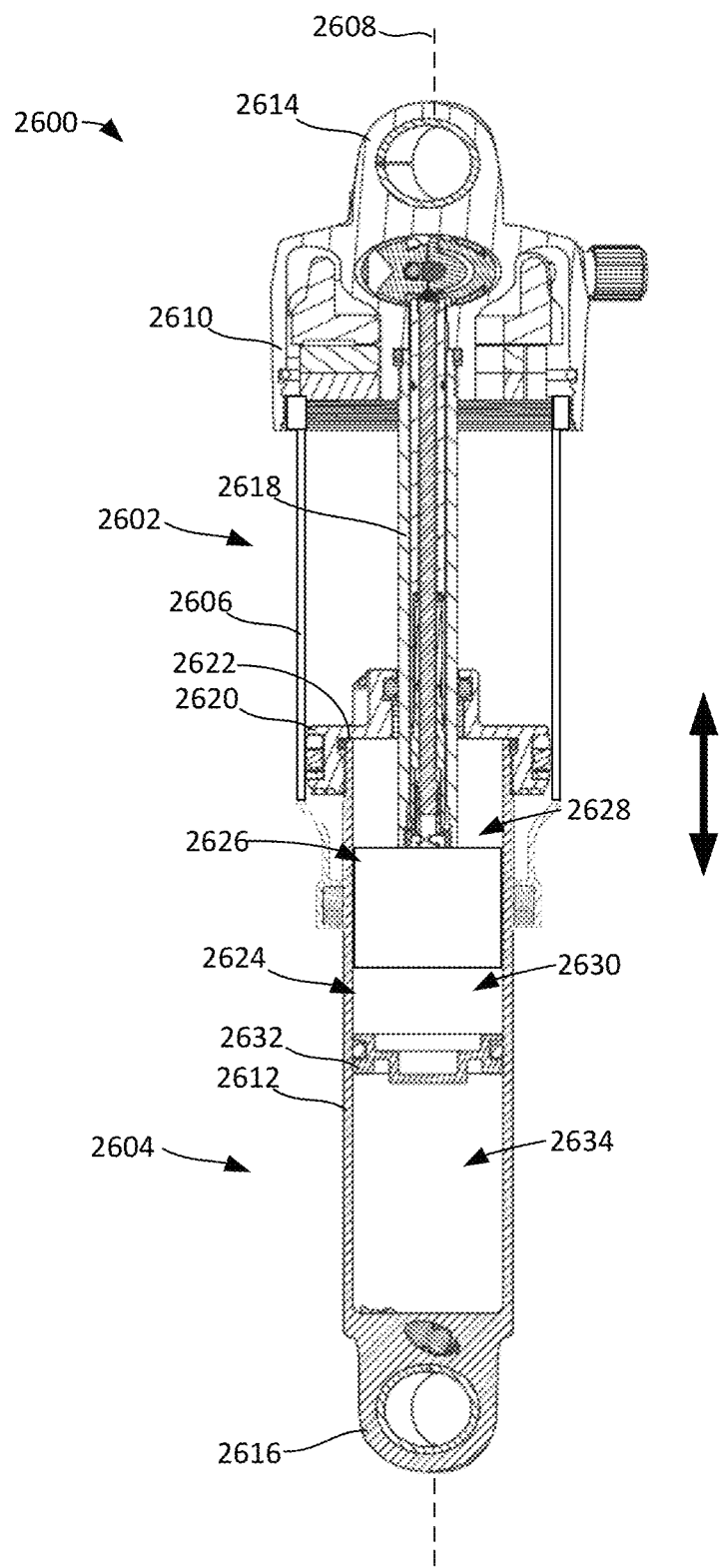
FIG. 26 is a cross-sectional view of another example shock absorber that can be implemented on the example bicycle of FIG. 1.

As disclosed above, in some examples a shock absorber can include an air can as a spring instead of a coil spring. The example dampers disclosed herein can be implemented in shock absorbers having such an air can. For example, FIG. 26 is a cross-sectional view of an example shock absorber 2600 that can be implemented as the shock absorber 136 and used on the bicycle 100 of FIG. 1. In the illustrated example, the shock absorber 2600 includes an integrated spring 2602 and damper 2604. In the illustrated example, the spring 2602 is implemented as an air can 2606. The spring 2602 and the damper 2604 are configured in a telescoping arrangement and aligned along an axis 2608.

In the illustrated example, the shock absorber 2600 includes a cap 2610, which forms a top (or end) of the air can 2606. The damper 2604 includes a damper body 2612. The cap 2610 and the damper body 2612 include respective first and second attachment portions 2614, 2616 (e.g., eyelets) at distal ends for connecting the shock absorber 2600 between two components of a bicycle, such as two points on the frame 102 (FIG. 1) of the bicycle 100 (FIG. 1), the frame 102 and the rocker 140 (FIG. 1) connected to the rear wheel 106 (FIG. 1) of the bicycle 100, and/or another intermediate part or component. The air can 2606 and the damper body 2612 are configured in a telescopic arrangement. In particular, in this example, the damper body 2612 is moveable into and out of the air can 2606 as shown by the double-sided arrow. For example, during compression, the first and second attachment portions 2614, 2616 are pushed toward each other, which moves the damper body 2612 into the air can 2606 (or moves the air can 2606 over the damper body 2612). Conversely, during rebound, the first and second attachment portions 2614, 2616 are pushed (or and/or pulled) apart at least in part by force from the spring 2602, which moves the damper body 2612 out of the air can 2606.

In the illustrated example, the damper 2604 includes a shaft 2618 that is coupled to and extends from the cap 2610. A fixed piston 2620 is coupled (e.g., via threaded engagement) to a top end 2622 of the damper body 2612. In the illustrated example, the damper body 2612 defines a chamber 2624. The shaft 2618 extends through the fixed piston 2620 and into the chamber 2624. The shaft 2618 slides into and out of the damper body 2612 through the fixed piston 2620 as the shock absorber 2600 compresses and rebounds. The fixed piston 2620 is slidable within the air can 2606. During compression (when the air can 2606 and the damper body 2612 move toward each other), the fixed piston 2620 is pushed into the air can 2606, which compresses a gas (e.g., air) within the air can 2606. After the compressive force is removed, the compressed gas in the air can 2606 acts against the fixed piston 2620 and pushes the fixed piston 2620 (and, thus, the damper body 2612) outward from the air can 2606. In other examples, the air can 2606 can be filled with other types of fluids (e.g., oil).

As shown in FIG. 26, the damper 2604 includes a damper member 2626 coupled to a distal end of the shaft 2618. The damper member 2626 divides the chamber 2624 into a first chamber 2628 and a second chamber 2630. In this example, the damper 2604 includes an internal floating piston (IFP) 2632 that is slidably disposed within the damper body 2612. The IFP 2632 separates the fluid in the second chamber 2630 from a pneumatic pressure chamber 2634 having a pneumatic fluid, such as air or nitrogen. The damper 2604 can be implemented as any of the example dampers 200, 1104 disclosed herein. The example dampers disclosed herein provide varying levels of damping during compression depending on the position of the damper member. This enables the damper to compress more quickly and thereby absorb shocks and vibrations.

While the example dampers disclosed herein are described in connection with shock absorbers having inline dampers and springs, the example dampers disclosed herein can also be used in other types of suspension components. For example, any of the example dampers disclosed herein can be implemented in a front fork of a bicycle. For instance, the damper can be integrated into one of the legs of the front fork.

Example systems, apparatus, and articles of manufacture for bicycles (and/or other vehicles) are disclosed herein. Examples and combinations of examples disclosed herein include the following:

Example 1 is a damper for a bicycle suspension component. The damper comprises a damper body defining a chamber, a shaft extending into the damper body, and a damper member disposed in the chamber and coupled to the shaft. The damper member divides the chamber into a first chamber and a second chamber. The damper member includes a piston having a first compression port and a bypass compression port. The damper member includes a first valve to control fluid flow through the first compression port and a second valve to control fluid flow through the bypass compression port. During a first portion of travel of the damper member during a compression stroke, the second valve is to open to enable fluid flow through the bypass compression port from the first chamber to the second chamber, and, during a second portion of travel of the damper member during the compression stroke, the first valve is to open to enable fluid flow through the first compression port from the first chamber to the second chamber.

Example 2 includes the damper of Example 1, wherein the second valve has a lower cracking pressure than the first valve.

Example 3 includes the damper of Examples 1 or 2, wherein the first and second valves are check valves.

Example 4 includes the damper of any of Examples 1-3, wherein, the first valve is to remain closed during the first portion of travel of the damper member, and the second valve is to remain closed during the second portion of travel of the damper member.

Example 5 includes the damper of any of Examples 1-4, wherein at least a portion of an outer side surface of the piston is sealingly engaged with an inner surface of the damper body to limit fluid flow between the piston and the inner surface of the damper body.

Example 6 includes the damper of Example 5, wherein the first compression port extends between a first end of the piston and a second end of the piston opposite the first end, and wherein the bypass compression port extending between the first compression port and the outer side surface of the piston.

Example 7 includes the damper of Example 6, wherein the chamber of the damper body has a first section with a first cross-sectional area and a second section with a second cross-sectional area that is greater than the first cross-sectional area.

Example 8 includes the damper of Example 7, wherein, during the first portion of the travel of the damper member, the bypass compression port is aligned with the second section, and wherein, during the second portion of the travel of the damper, the bypass compression port is aligned with the second section and blocked by the inner surface of the damper member.

Example 9 includes the damper of Examples 7 or 8, further including a sleeve in the damper body, the sleeve forming the inner surface of the damper body along the first section, wherein the sleeve is moveable to adjust a length of the first section and a length of the second section.

Example 10 includes the damper of any of Examples 1-9, wherein the piston has a rebound port, wherein the damper member includes a third valve to control fluid flow through the rebound port, and wherein, during a rebound stroke, the third valve is to open and the first and second valves are to close.

Example 11 is damper for a bicycle suspension component. The damper comprises a damper body defining a chamber, the chamber having a first section with a first cross-sectional area and a second section with a second cross-sectional area greater than the first cross-sectional area, a shaft extending into the damper body, a damper member disposed in the chamber and coupled to the shaft, the damper member dividing the chamber into a first chamber and a second chamber, the damper member including a piston having a plurality of radial openings, a first seal around the piston, and a second seal around the piston, the radial openings axially spaced between the first and second seals. During a first portion of travel of the damper member during a compression stroke, the first seal is engaged with an inner surface of the damper body along the first section of the chamber and the second seal is spaced from the inner surface of the damper body along the second section of the chamber to enable fluid flow through the radial openings from the first chamber to the second chamber, and, during a second portion of travel of the damper member during the compression stroke, the first and second seals are engaged with the inner surface along the first section of the chamber to prevent fluid flow through the radial openings from the first chamber to the second chamber.

Example 12 includes the damper of Example 11, wherein the radial openings are aligned along axes that are radial relative to an axis of movement of the damper member.

Example 13 includes the damper of Examples 11 or 12, wherein the damper member includes a ring disposed around the piston and aligned with the radial openings Example 14 includes the damper of Example 13, wherein the ring is expandable.

Example 15 includes the damper of any of Examples 11-14, wherein the radial openings are arranged in a first set and a second set that are axially spaced apart.

Example 16 includes the damper of any of Examples 11-15, wherein the piston includes a disc defining a compression channel, wherein the damper member includes a compression shim stack covering the compression channel.

Example 17 includes the damper of Example 16, wherein a cracking pressure of the ring is less than the compression shim stack.

Example 18 is a damper for a bicycle suspension component. The damper comprises a damper body, a shaft extending into the damper body, a damper member disposed in the damper body and coupled to the shaft, the damper member including a piston sealingly engaged with an inner surface of the damper body to divide the damper body into a first chamber and a second chamber, first means for allowing fluid flow across the piston from the first chamber to the second chamber during a first portion of travel of the damper member during a compression stroke, and second means for allowing fluid flow across the piston from the first chamber to the second chamber during a second portion of travel of the damper member during the compression stroke.

Example 19 includes the damper of Example 18, wherein the first means provides less fluid resistance than the second means.

Example 20 includes the damper of Examples 18 or 19, further including means for controlling a length of the first portion of travel of the damper member.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A damper for a bicycle suspension component, the damper comprising:
   a damper body defining a chamber;
   a shaft extending into the damper body; and
   a damper member disposed in the chamber and coupled to the shaft, the damper member dividing the chamber into a first chamber and a second chamber, the damper member including a piston having a first compression port and a bypass compression port, the damper member including a first valve to control fluid flow through the first compression port and a second valve to control fluid flow through the bypass compression port, wherein:
      during a first portion of travel of the damper member during a compression stroke, the second valve is to open to enable fluid flow through the bypass compression port from the first chamber to the second chamber, and
      during a second portion of travel of the damper member during the compression stroke, the first valve is to open to enable fluid flow through the first compression port from the first chamber to the second chamber, wherein the second valve has a lower cracking pressure than the first valve.

2. The damper of claim 1, wherein at least a portion of an outer side surface of the piston is sealingly engaged with an inner surface of the damper body to limit fluid flow between the piston and the inner surface of the damper body.

3. The damper of claim 2, wherein the first compression port extends between a first end of the piston and a second end of the piston opposite the first end, and wherein the bypass compression port extends between the first compression port and the outer side surface of the piston.

4. The damper of claim 3, wherein the chamber of the damper body has a first section with a first cross-sectional area and a second section with a second cross-sectional area that is greater than the first cross-sectional area.

5. The damper of claim 4, wherein, during the first portion of the travel of the damper member, the bypass compression port is aligned with the second section, and wherein, during the second portion of the travel of the damper, the bypass compression port is aligned with the second section and blocked by the inner surface of the damper member.

6. The damper of claim 4, further including a sleeve in the damper body, the sleeve forming the inner surface of the damper body along the first section, wherein the sleeve is moveable to adjust a length of the first section and a length of the second section.

7. The damper of claim 1, wherein the first and second valves are check valves.

8. The damper of claim 1, wherein, the first valve is to remain closed during the first portion of travel of the damper member, and the second valve is to remain closed during the second portion of travel of the damper member.

9. The damper of claim 1, wherein the piston has a rebound port, wherein the damper member includes a third valve to control fluid flow through the rebound port, and wherein, during a rebound stroke, the third valve is to open and the first and second valves are to close.

10. A damper for a bicycle suspension component, the damper comprising:
a damper body defining a chamber, the chamber having a first section with a first cross-sectional area and a second section with a second cross-sectional area greater than the first cross-sectional area;
a shaft extending into the damper body;
a damper member disposed in the chamber and coupled to the shaft, the damper member dividing the chamber into a first chamber and a second chamber, the damper member including a piston having a plurality of radial openings;
a first seal around the piston; and
a second seal around the piston, the radial openings axially spaced between the first and second seals, wherein,
during a first portion of travel of the damper member during a compression stroke, the first seal is engaged with an inner surface of the damper body along the first section of the chamber and the second seal is spaced from the inner surface of the damper body along the second section of the chamber to enable fluid flow through the radial openings from the first chamber to the second chamber, and
during a second portion of travel of the damper member during the compression stroke, the first and second seals are engaged with the inner surface along the first section of the chamber to prevent fluid flow through the radial openings from the first chamber to the second chamber.

11. The damper of claim 10, wherein the damper member includes a ring disposed around the piston and aligned with the radial openings.

12. The damper of claim 11, wherein the ring is expandable.

13. The damper of claim 10, wherein the piston includes a disc defining a compression channel, wherein the damper member includes a compression shim stack covering the compression channel.

14. The damper of claim 13, wherein a cracking pressure of the ring is less than the compression shim stack.

15. The damper of claim 10, wherein the radial openings are aligned along axes that are radial relative to an axis of movement of the damper member.

16. The damper of claim 10, wherein the radial openings are arranged in a first set and a second set that are axially spaced apart.

17. A damper for a bicycle suspension component, the damper comprising:
a damper body;
a shaft extending into the damper body;
a damper member disposed in the damper body and coupled to the shaft, the damper member including a piston sealingly engaged with an inner surface of the damper body to divide the damper body into a first chamber and a second chamber;
first means for allowing fluid flow across the piston from the first chamber to the second chamber during a first portion of travel of the damper member during a compression stroke; and
second means for allowing fluid flow across the piston from the first chamber to the second chamber during a second portion of travel of the damper member during the compression stroke, wherein the first means provides less fluid resistance than the second means.

18. The damper of claim 17, further including means for controlling a length of the first portion of travel of the damper member.

\* \* \* \* \*